(12) United States Patent
Im et al.

(10) Patent No.: US 12,265,430 B2
(45) Date of Patent: Apr. 1, 2025

(54) HINGE MECHANISM AND FOLDABLE DEVICE HAVING SAME

(71) Applicant: GOOGLE LLC, Mountain View, CA (US)

(72) Inventors: Young Im, Sunnyvale, CA (US); Kingston Xu, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 174 days.

(21) Appl. No.: 17/596,606

(22) PCT Filed: Dec. 10, 2019

(86) PCT No.: PCT/US2019/065450
§ 371 (c)(1),
(2) Date: Dec. 14, 2021

(87) PCT Pub. No.: WO2021/118538
PCT Pub. Date: Jun. 17, 2021

(65) Prior Publication Data
US 2022/0261046 A1 Aug. 18, 2022

(51) Int. Cl.
| | | |
|---|---|---|
| *E05D 3/06* | (2006.01) | |
| *G06F 1/16* | (2006.01) | |
| *E05D 7/00* | (2006.01) | |
| *E05D 11/08* | (2006.01) | |

(52) U.S. Cl.
CPC .......... *G06F 1/1681* (2013.01); *G06F 1/1616* (2013.01); *E05D 7/00* (2013.01); *E05D 11/08* (2013.01); *E05Y 2999/00* (2024.05)

(58) Field of Classification Search
CPC ...... G06F 1/1681; G06F 1/1641; E05D 3/122
USPC ........................................... 16/368, 369, 370
See application file for complete search history.

(56) References Cited

U.S. PATENT DOCUMENTS

| | | | |
|---|---|---|---|
| 9,946,310 B1 * | 4/2018 | Huang | ............... G06F 1/1681 |
| 10,401,917 B1 | 9/2019 | Dai et al. | |
| 2010/0246113 A1 | 9/2010 | Visser et al. | |
| 2014/0196254 A1 * | 7/2014 | Song | ..................... E05D 3/16 16/302 |

(Continued)

FOREIGN PATENT DOCUMENTS

| | | |
|---|---|---|
| CN | 105637242 A | 6/2016 |
| CN | 109478384 A | 3/2019 |

(Continued)

OTHER PUBLICATIONS

International Search Report and Written Opinion for PCT Application No. PCT/US2019/065450, mailed on Sep. 1, 2020, 16 pages.

(Continued)

*Primary Examiner* — Emily M Morgan
(74) *Attorney, Agent, or Firm* — Shumaker & Sieffert, P.A.

(57) ABSTRACT

A foldable device may include a foldable layer and a hinge mechanism. The hinge mechanism may include a plurality of rod assemblies, arranged side by side, each defining an individual pivot axis of the hinge mechanism. The rod assemblies may each include a plurality of segments. One or more of the plurality of segments of one of the plurality of rod assemblies may be coupled to one both of the adjacent rod assemblies, such that the rod assemblies pivot sequentially to guide the folding and the unfolding of the foldable layer of the foldable device.

19 Claims, 17 Drawing Sheets

(56) References Cited

U.S. PATENT DOCUMENTS

| | | | |
|---|---|---|---|
| 2015/0062793 A1 | 3/2015 | Chen et al. | |
| 2016/0147267 A1 | 5/2016 | Campbell et al. | |
| 2016/0187935 A1 | 6/2016 | Tazbaz et al. | |
| 2018/0067519 A1* | 3/2018 | Tazbaz | H04M 1/022 |
| 2018/0088634 A1 | 3/2018 | Bitz | |
| 2019/0098775 A1 | 3/2019 | Cho | |

FOREIGN PATENT DOCUMENTS

| | | | |
|---|---|---|---|
| CN | 208806015 U | 4/2019 | |
| KR | 20170143144 A | 12/2017 | |
| TW | M584377 U | 10/2019 | |
| WO | WO-2019179616 A1 * | 9/2019 | G06F 1/1616 |

OTHER PUBLICATIONS

International Preliminary Report on Patentability from International Application No. PCT/US2019/065450 dated May 17, 2022, 12 pp.

First Office Action and Search Report, and translation thereof, from counterpart Chinese Application No. 201980100639.8 dated Sep. 13, 2023, 37 pp.

Second Office Action from counterpart Chinese Application No. 201980100639.8 dated Apr. 13, 2024, 22 pp.

Third Office Action, and translation thereof, from counterpart Chinese Application No. 201980100639.8 dated Aug. 2, 2024, 10 pp.

Response to Communication pursuant to Article 94(3) EPC dated Mar. 5, 2024, from counterpart European Application No. 19828517.3 filed Jun. 28, 2024, 81 pp.

Communication pursuant to Article 94(3) EPC from counterpart European Application No. 19828517.3 dated Mar. 5, 2024, 9 pp.

Notice of Intent to Grant, and translation thereof, from counterpart Chinese Application No. 201980100639.8 dated Oct. 15, 2024, 4 pp.

Response to Third Office Action, and machine translation thereof, from counterpart Chinese Application No. 201980100639.8 filed Sep. 30, 2024, 19 pp.

* cited by examiner

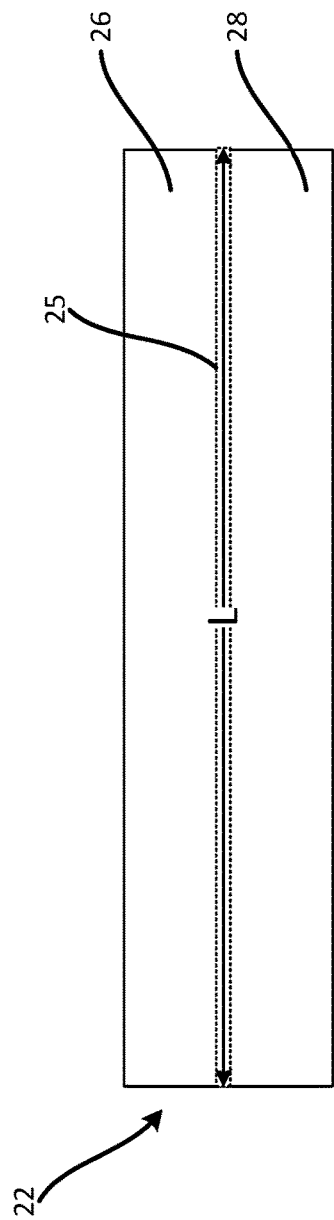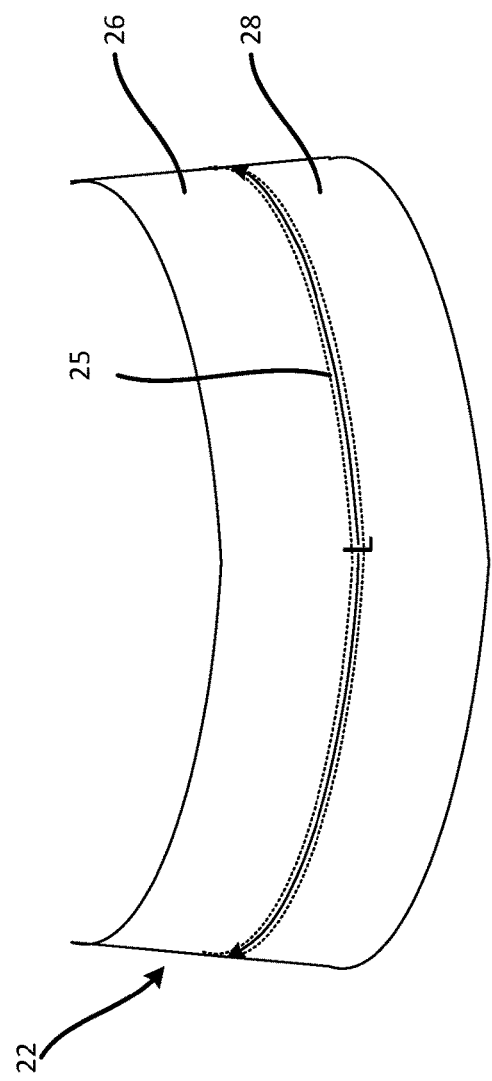
FIG. 3A
FIG. 3B

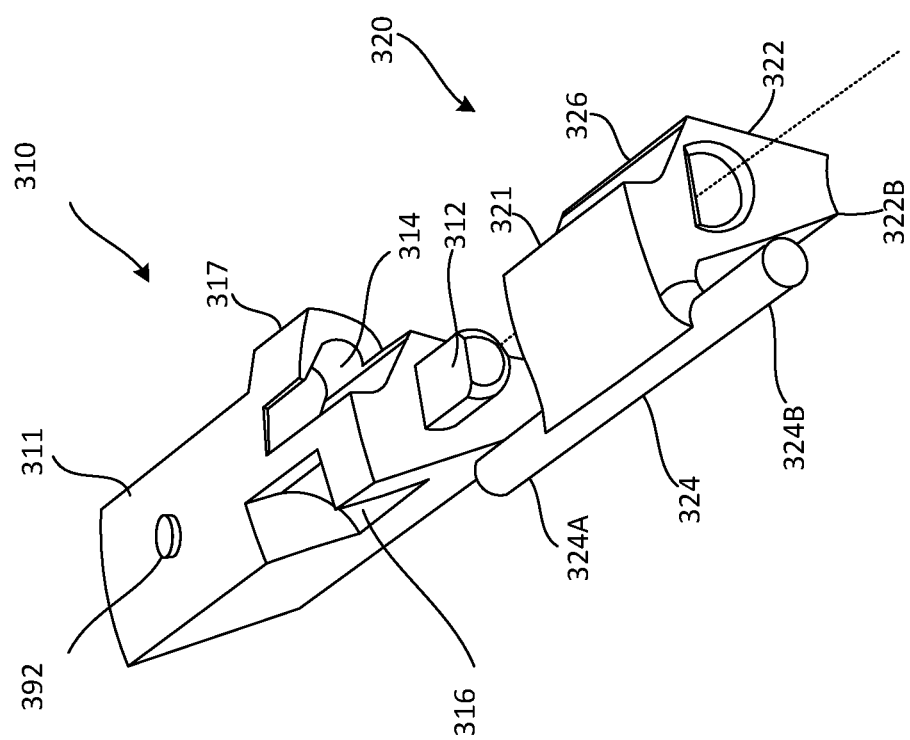

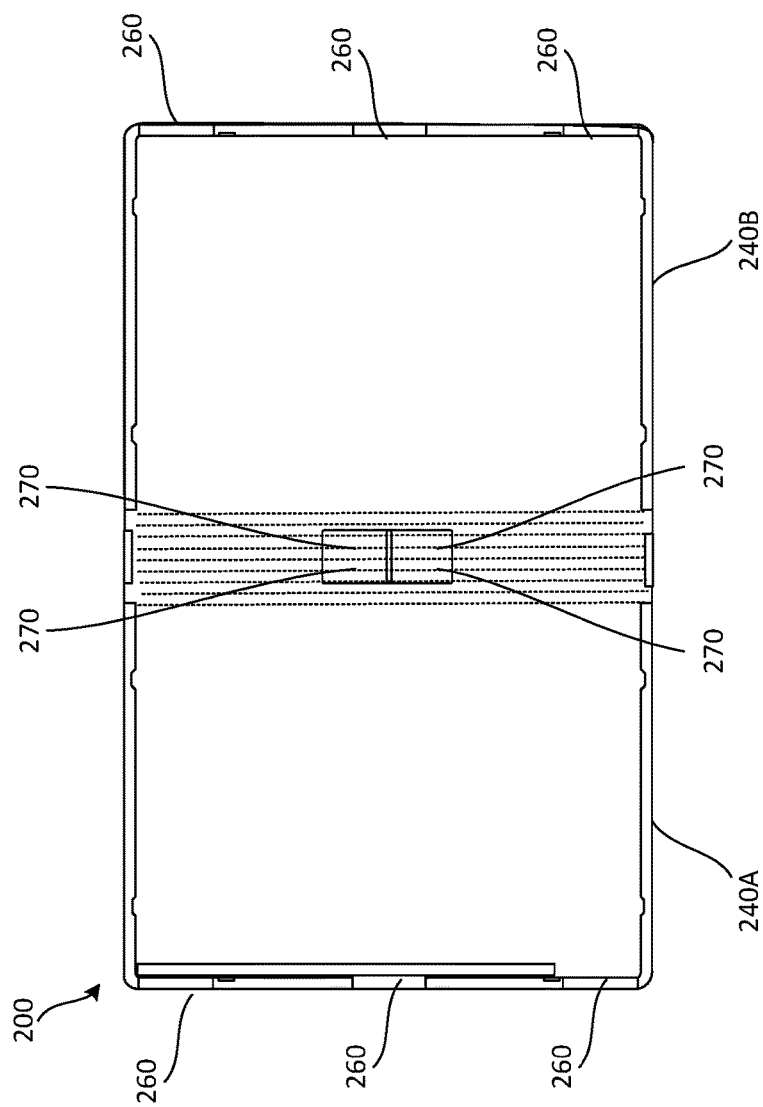
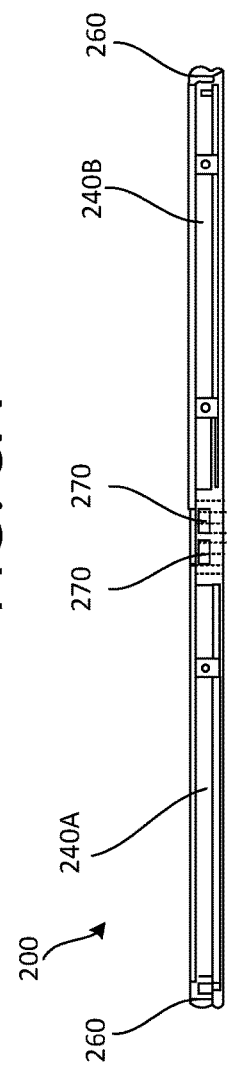
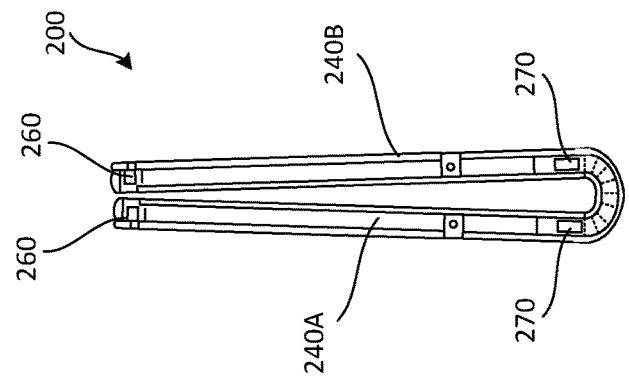
FIG. 8A
FIG. 8B
FIG. 8C

HINGE MECHANISM AND FOLDABLE DEVICE HAVING SAME

CROSS REFERENCE TO RELATED APPLICATION

This application is a 35 U.S.C. § 371 National Phase Entry Application from PCT/US2019/065450, filed Dec. 10, 2019, designating the U.S., the disclosure of which is incorporated herein by reference in its entirety.

TECHNICAL FIELD

This description relates, in general, to hinge mechanisms for foldable devices, and, in particular, to hinge mechanisms supporting foldable display systems.

BACKGROUND

Modern computing devices often attempt to achieve a balance between portability and functionality. The desire for a device that provides for a rich display of information on a single surface (suggesting a device having a relatively large form factor) may conflict with the desire to have a device that is small enough to be easily carried and easily accessible (suggesting a device having a relatively small form factor). A flexible, or foldable, display device may enhance the capabilities of a computing device, in that, in a folded configuration, the computing device may have a relatively small form factor, and in an unfolded configuration, the device may take advantage of a relatively large display area. Flexible, or foldable, display devices may be fragile and prone to deformation and damage, particularly when a neutral axis of bending is not maintained as the foldable display device is folded and unfolded, thus degrading reliability and product performance. In some situations, mechanisms guiding and supporting the folding and unfolding of such a display device may be relatively complex, and susceptible to failure. These complex mechanisms may produce a somewhat artificial folding motion, and may not provide support through the folding/unfolding motion, thus introducing stress on the display device, and damaging components of the display device. A hinge mechanism that provides dynamic support, and that guides movement of the foldable display device without causing a shift in the neutral axis of bending, may produce a more natural folding motion, may maintain a desired contour, or curvature, of the display device in the folded configuration, may yield a desired flatness in the unfolded configuration, and may prevent damage to the display portion of the foldable display device due to excessive compression and/or tension exerted on components of the display portion.

SUMMARY

In a general aspect, a hinge mechanism may include a plurality of rod assemblies arranged in a respective plurality of rows extending in parallel. Each of the plurality of rod assemblies may include a plurality of segments sequentially arranged in a longitudinal direction of the respective rod assembly. The plurality of segments may define a first section of the hinge mechanism that guides a sequential pivoting motion of each of the plurality of rod assemblies, a second section of the hinge mechanism that couples each of the plurality of rod assemblies to at least one adjacent rod assembly, and a third section of the hinge mechanism that restricts movement of the plurality of rod assemblies to maintain a position of the hinge mechanism between a minimum bend radius and a maximum bend radius.

In some implementations, the plurality of segments may include a first segment, a second segment and a third segment. The first segment may include a first body, a shaft extending outward from an end portion of the first body, a guide slot defined in a protrusion formed on a first side portion of the first body, and a guide recess defined in a second side portion of the first body. The second segment may include a second body, a slot formed in and extending through the second body, a guide recess defined in a first side portion of the second body, and a guide pin positioned along a second side portion of the second body. The third segment may include a third body, a shaft extending outward from an end portion of the third body, a guide slot defined in a protrusion formed on a first side portion of the third body, and a guide recess defined in a second side portion of the third body. The first section of the hinge mechanism may be defined by the first, second and third segments of each of the plurality of rod assemblies.

In some implementations, the shaft of the first segment may be received in a first end portion of the slot formed in the second segment, and the shaft of the third segment may be received in a second end portion of the slot formed in the second segment, to couple the first, second and third segments, so as to axially couple the first, second and third segments. In some implementations, a first end portion of the guide pin of the second segment of a first rod assembly of the plurality of rod assemblies may be received in the guide slot of the first segment of a second rod assembly of the plurality of rod assemblies, and a second end portion of the guide pin of the second segment of the first rod assembly may be received in the guide slot of the third segment of the second rod assembly. In some implementations, the first and second rod assemblies may be positioned adjacent to each other in the plurality of rows of rod assemblies, such that the second rod assembly pivots in response to a pivoting movement of the first rod assembly and corresponding movement of the guide pin of the first rod assembly in the guide slot of the first segment of the second rod assembly and the guide slot of the third segment of the second rod assembly.

In some implementations, the plurality of segments may include a fourth segment, including a rod having a first end coupled to the third segment, and at least one linkage mounted on the rod. The at least one linkage may couple the respective rod assembly to the rod of an adjacent rod assembly. The second section of the hinge mechanism may be defined by the fourth segment of each of the plurality of rod assemblies. In some implementations, the at least one linkage may include a fourth body, a first passage formed through the fourth body, wherein the rod extends through the first passage, a second passage formed through the fourth body, and a connecting pin positioned in the second passage, wherein the connection pin couples the respective rod assembly to the second passage of the at least one linkage of an adjacent rod assembly. The rod may be press fit in the first passage, and the connecting pin may be press fit in the second passage.

In some implementations, the plurality of segments may include a fifth segment, wherein a second end of the rod is coupled to the fifth segment, and a sixth segment coupled to the fifth segment. The third section of the hinge mechanism may be defined by the fifth and sixth segments of each of the plurality of rod assemblies. In some implementations, the fifth segment may include a fifth body, a guide recess formed in a first side portion of the fifth body, and a protrusion formed on a second side portion of the fifth body. The protrusion may be movably received in the guide recess of an adjacent rod assembly. Rotation of adjacent rod assemblies may be restricted in a first direction in response to a positioning of the protrusion of the respective rod assembly against a first end portion of the guide recess in the adjacent rod assembly. Rotation of adjacent rod assemblies may be restricted in a second direction in response to a positioning of the protrusion of the respective rod assembly at a second end portion of the guide recess in the adjacent rod assembly and a positioning of the second side portion of the fifth segment of the respective rod assembly against the first side portion of the fifth segment of the adjacent rod assembly.

In some implementations, the sixth segment may include a sixth body, a protrusion formed on a first side portion of the sixth body, and a guide recess formed on a second side portion of the sixth body. The protrusion may be movably received in the guide recess of an adjacent rod assembly. Rotation of adjacent rod assemblies may be restricted in the first direction in response to a positioning of the protrusion of the respective rod assembly against a first end portion of the guide recess in the adjacent rod assembly. Rotation of adjacent rod assemblies may be restricted in the second direction in response to a positioning of the protrusion of the respective rod assembly at a second end portion of the guide recess in the adjacent rod assembly and a positioning of the second side portion of the sixth segment of the respective rod assembly against the first side portion of the second segment of the adjacent rod assembly.

In some implementations, a bendable sheet may be coupled to the plurality of rod assemblies and positioned between the hinge mechanism and a foldable display of a computing device.

In some implementations, the plurality of segments of each rod assembly, of the plurality of rod assemblies, may be coaxially aligned. In some implementations, each rod assembly, of the plurality of rod assemblies, may define a respective pivot axis of the hinge mechanism.

In another general aspect, a computing device may include a housing, a foldable display coupled to the housing, a hinge mechanism received in the housing, at a position corresponding to a bendable section of the foldable display, and a bendable sheet positioned between the hinge mechanism and the foldable display. The hinge mechanism may include a plurality of rod assemblies arranged in a respective plurality of rows. Each rod assembly of the plurality of rod assemblies may be movably coupled to at least one adjacent rod assembly of the plurality of rod assemblies. The plurality of rod assemblies may define a respective plurality of pivot axes of the hinge mechanism. The plurality of rod assemblies may pivot sequentially about the respective plurality of pivot axes in response to an external force to guide a folding of the foldable display.

In some implementations, each rod assembly may include a first section guiding a folding and an unfolding motion of the hinge mechanism and the foldable display coupled thereto. The first section may include a first segment, a second segment coupled to the first segment, and a third segment coupled to the second segment. A second section may couple the rod assembly to an adjacent rod assembly, and may generate friction that resists motion of the hinge mechanism. The second section may include a fourth segment coupled to the third segment. A third section may restrict movement of the rod assembly to maintain a position of the hinge mechanism between a minimum bend radius and a maximum bend radius of the foldable display coupled thereto. The third section may include a fifth segment coupled to the fourth segment, and a sixth segment coupled to the fifth segment.

In some implementations, the first segment may include a first body, a shaft extending outward from an end portion of the first body, a guide slot defined in a protrusion formed on a first side portion of the first body, and a guide recess defined in a second side portion of the first body. The second segment may include a second body, a slot formed in and extending through the second body, a guide recess defined in a first side portion of the second body, and a guide pin positioned along a second side portion of the second body. The third segment may include a third body, a shaft extending outward from an end portion of the third body, a guide slot defined in a protrusion formed on a first side portion of the third body, and a guide recess defined in a second side portion of the third body.

In some implementations, the fourth segment may include a rod having a first end coupled to the third segment, and at least one linkage mounted on the rod. The at least one linkage may include a fourth body, a first passage formed through the fourth body, wherein the rod extends through the first passage, and a second passage formed through the fourth body. A connecting pin may be positioned in the second passage. The connecting pin may couple the respective rod assembly to the second passage of the at least one linkage of the adjacent rod assembly. In some implementations, the fifth segment may include a fifth body, a guide recess formed in a first side portion of the fifth body, and a protrusion formed on a second side portion of the fifth body. The protrusion may be movably received in the guide recess of an adjacent rod assembly. Rotation of adjacent rod assemblies may be restricted in a first direction in response to a positioning of the protrusion of the respective rod assembly against a first end portion of the guide recess in the adjacent rod assembly. Rotation of adjacent rod assemblies may be restricted in a second direction in response to a positioning of the protrusion of the respective rod assembly at a second end portion of the guide recess in the adjacent rod assembly and a positioning of the second side portion of the fifth segment of the respective rod assembly against the first side portion of the fifth segment of the adjacent rod assembly.

In some implementations, the sixth segment may include a sixth body, a protrusion formed on a first side portion of the sixth body, and a guide recess formed on a second side portion of the sixth body. The protrusion may be movably received in the guide recess of an adjacent rod assembly. Rotation of adjacent rod assemblies may be restricted in the first direction in response to a positioning of the protrusion of the respective rod assembly against a first end portion of the guide recess in the adjacent rod assembly. Rotation of adjacent rod assemblies may be restricted in the second direction in response to a positioning of the protrusion of the respective rod assembly at a second end portion of the guide recess in the adjacent rod assembly and a positioning of the second side portion of the sixth segment of the respective rod assembly against the first side portion of the second segment of the adjacent rod assembly.

BRIEF DESCRIPTION OF THE DRAWINGS

FIGS. 3A and 3B are schematic diagrams of a neutral layer of a foldable device.

FIGS. 5A and 5B are exploded perspective views of exemplary rod assemblies of the exemplary hinge mechanism shown in FIGS. 4A-4C, in accordance with implementations described herein.

FIG. 8A is a top view, and FIG. 8B is a side view, of an exemplary computing device including an exemplary hinge mechanism, in an unfolded configuration, and FIG. 8C is a side view of the exemplary computing device including the exemplary hinge mechanism, in a folded configuration, in accordance with implementations described herein.

DETAILED DESCRIPTION

A hinge mechanism, in accordance with implementations, as described herein, may include multiple pivot axes that allow for dynamic movement of a of a plurality of rod assemblies thereof, in multiple directions, to support and guide the folding and the unfolding of a foldable display of a computing device. In some implementations, a hinge mechanism, in accordance with implementations described herein, may provide for a change in length in synchronization with a neutral axis of the foldable display, as the hinge mechanism guides the folding and unfolding of the computing device, to avoid undue stress on fragile components of the foldable display. In some implementations, the hinge mechanism may maintain the foldable display within allowable bending radius limits of the foldable display, both in the folded configuration and in the unfolded configuration of the computing device. In some implementations, the hinge mechanism may maintain a desired degree of planarity of the foldable display in the unfolded configuration of the computing device.

Figure 1A:
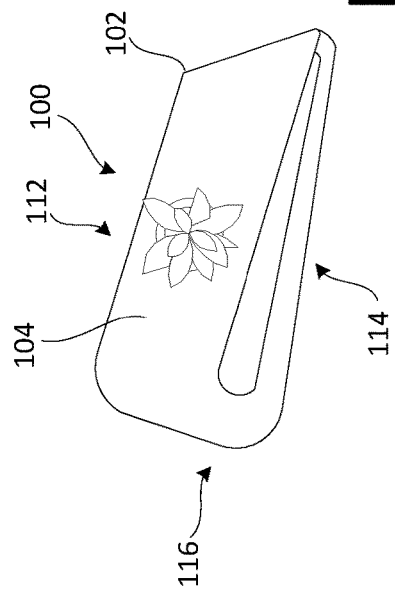
FIGS. 1A-1D illustrate an exemplary computing device including an exemplary foldable display.
Figure 1B:
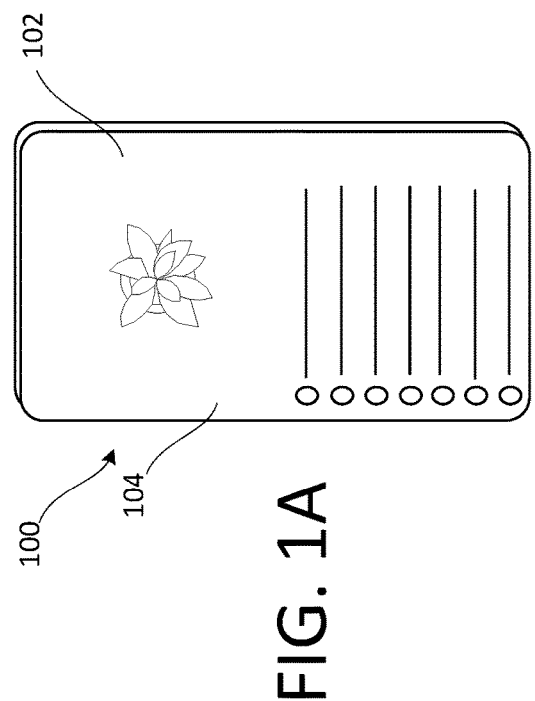
Figure 1C:
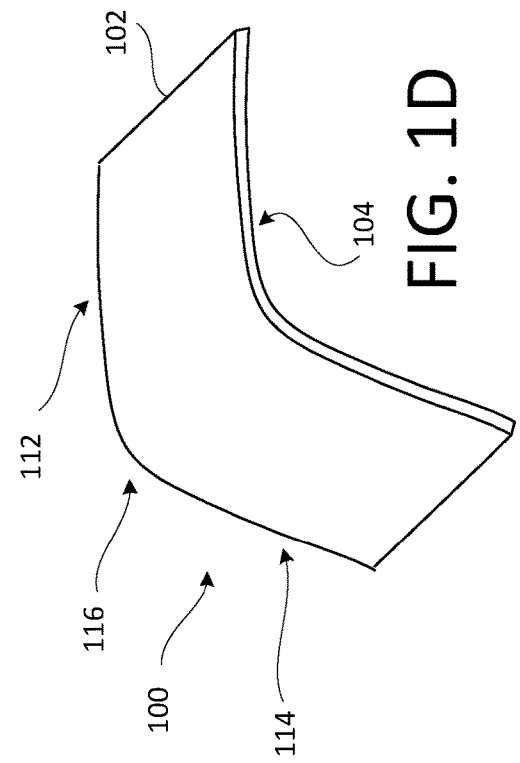
Figure 1D:
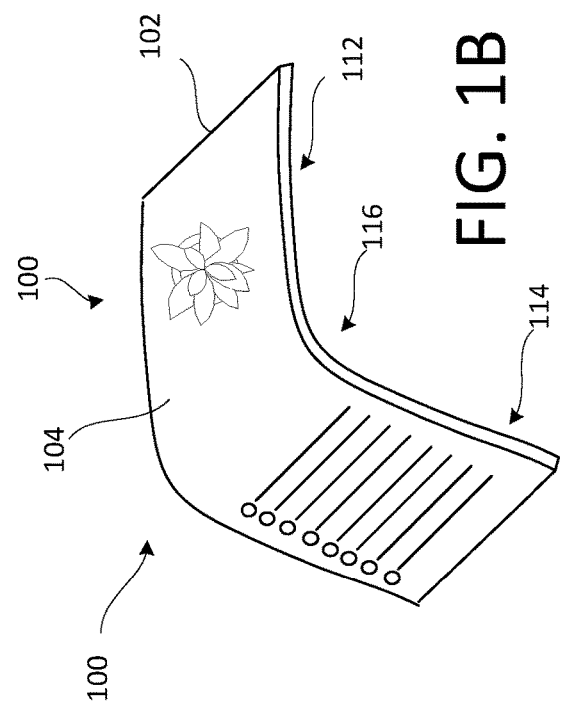

FIGS. 1A-1D illustrate an exemplary computing device 100 that includes a foldable layer 102. In particular, FIG. 1A is a front view of the exemplary computing device 100 in an unfolded configuration. FIG. 1B is a perspective view of the exemplary computing device 100 in a partially folded configuration. FIG. 1C is a side view of the exemplary computing device 100 in a fully folded configuration. FIG. 1D is a perspective view of the exemplary computing device 100 in a partially folded configuration. In the exemplary computing device 100 shown in FIGS. 1B and 1C, the foldable layer 102 is a foldable display 102 that is mounted so that a display surface 104 faces outward in the folded configuration. In the exemplary computing device 100 shown in FIG. 1D, the foldable layer 102 is a foldable display 102 that is mounted so that a display surface 104 faces inward in the folded configuration. The foldable display 102 can include a flexible organic light emitting diode (OLED) layer.

In some implementations, the foldable display 102 can include a first relatively flat, relatively rigid, or-semi-rigid, section 112, a second relatively flat, relatively rigid, or semi-rigid, section 114, and a foldable portion or bendable section 116. In some implementations, the foldable display 102 can include more than two flat, rigid sections 112, 114 and/or more than one bendable section 116. In some implementations, the foldable display 102 can include zero, or only one, flat rigid section 112, 114. For example, when a foldable display 102 includes zero flat rigid sections, the foldable display 102 may be substantially continuously bendable, and may be rolled up, as in a scroll. The exemplary foldable display 102 shown in FIGS. 1A-1D includes an exemplary bendable section 116 that allows the foldable display 102 to bend about an axis. In some implementations, the foldable display 102 can include more than one bendable section that allows the flexible display 102 to bend about more than one axis.

In the exemplary computing device 100 shown in FIGS. 1A-1D, the bendable section 116 may allow the foldable display 102 to bend, or fold, for example, in an arcuate shape, that has a bending radius, and/or radius of curvature. In some implementations, a hinge mechanism, in accordance with implementations described herein, may support and guide a folding and an unfolding of the foldable display 102 at the bendable section 116. In some implementations, the hinge mechanism, in accordance with implementations described herein, may be installed in the computing device 100, at a position corresponding to the bendable section 116 of the foldable display 102. In some implementations, the hinge mechanism may limit or restrict folding or bending of the foldable display 102 to within allowable bending parameters, to prevent damage to fragile components of the foldable display 102. For example, in the folded configuration shown in FIG. 1C, the hinge mechanism may prevent the foldable display 102 from bending beyond a minimum bending radius (e.g., less than 10 millimeters, less than 5 millimeters, or less than 2 millimeters). In the unfolded configuration shown in FIG. 1A, the hinge mechanism may prevent the foldable display from bending beyond a maximum bending radius.

Figure 2A:
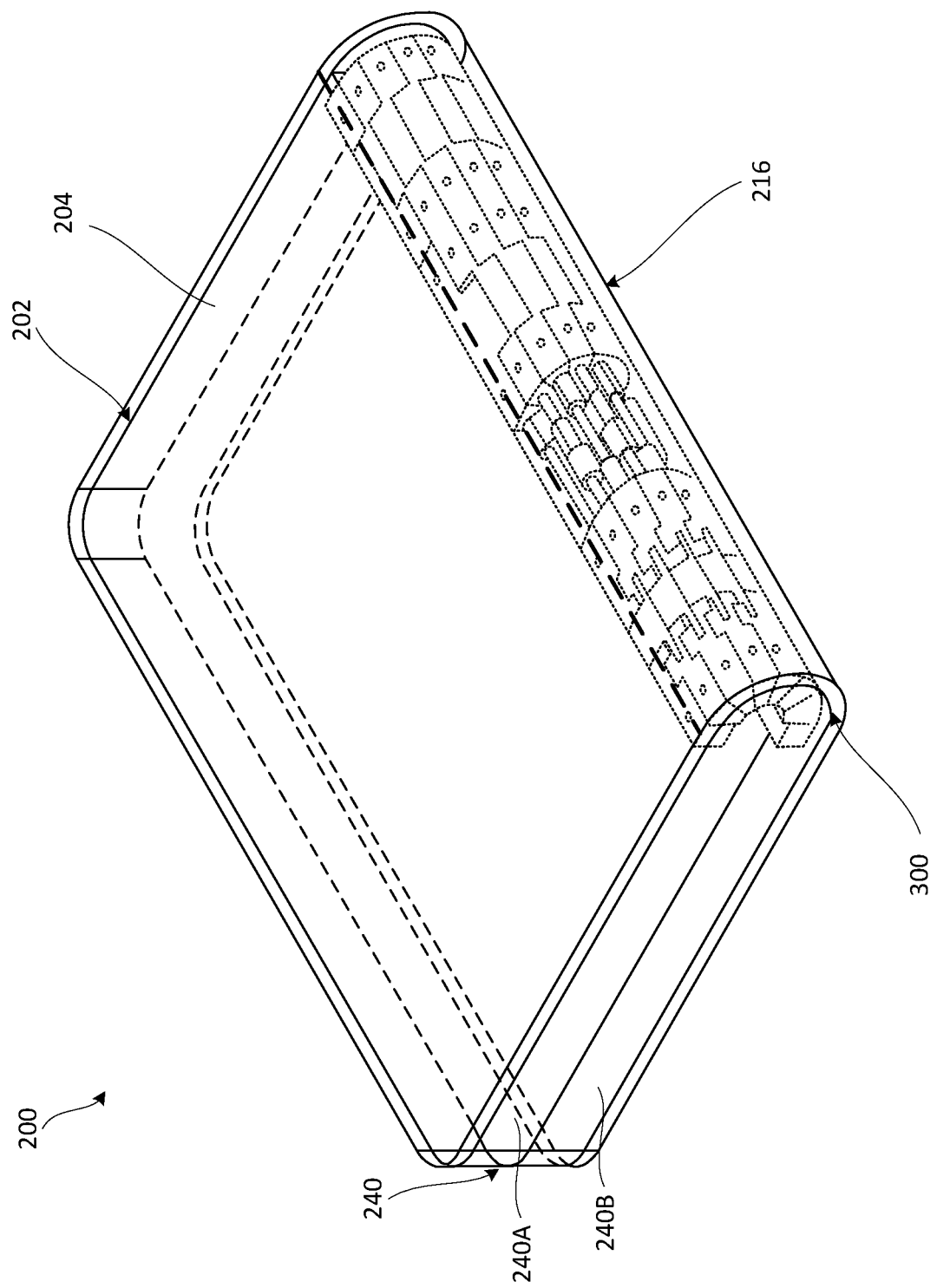
FIG. 2A is a perspective view of an exemplary computing device including an exemplary hinge mechanism, in a folded configuration, in accordance with implementations described herein.
Figure 2B:
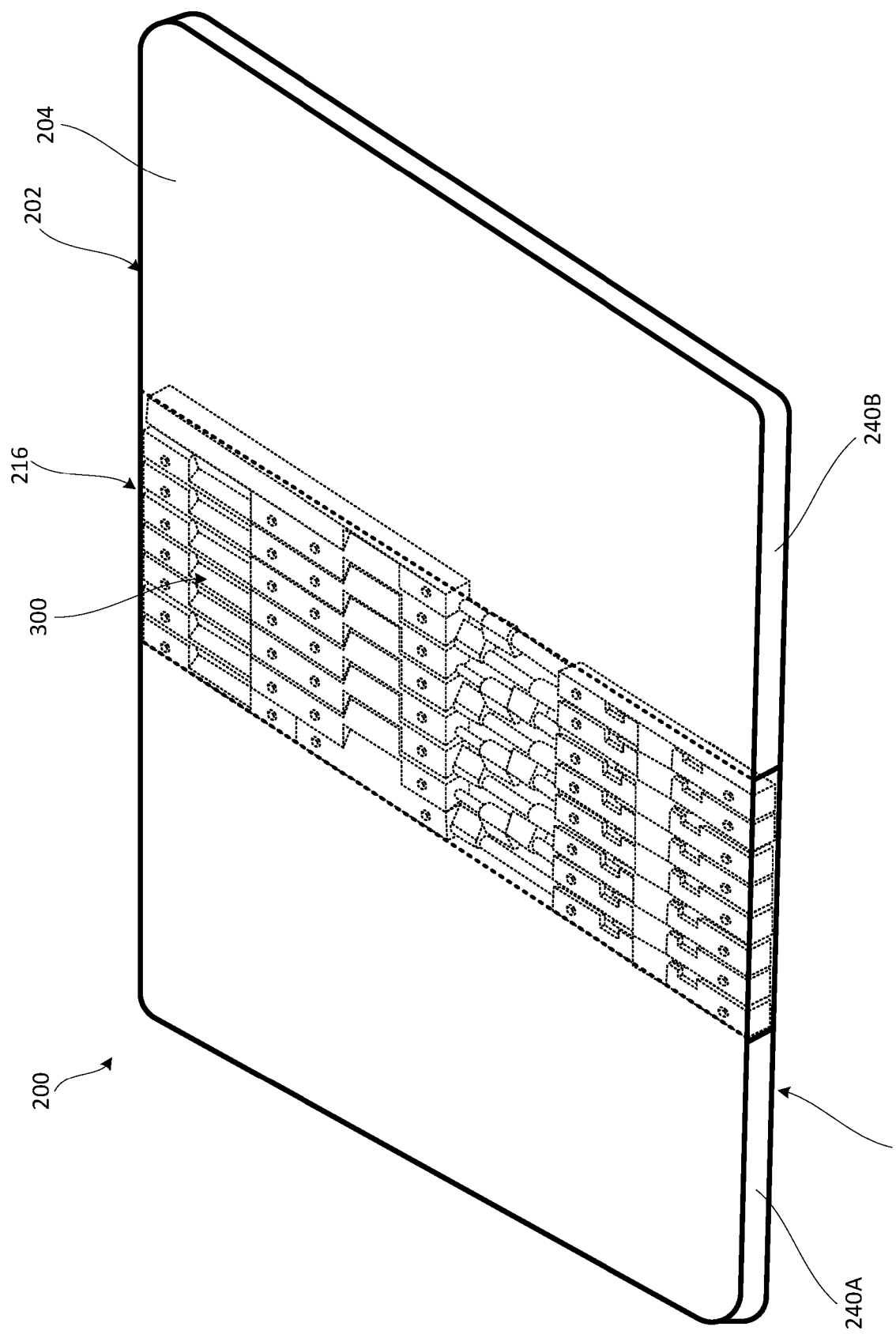
FIG. 2B is a perspective view of the exemplary computing device including the exemplary hinge mechanism shown in FIG. 2A, in an unfolded configuration, in accordance with implementations described herein.
Figure 2C:
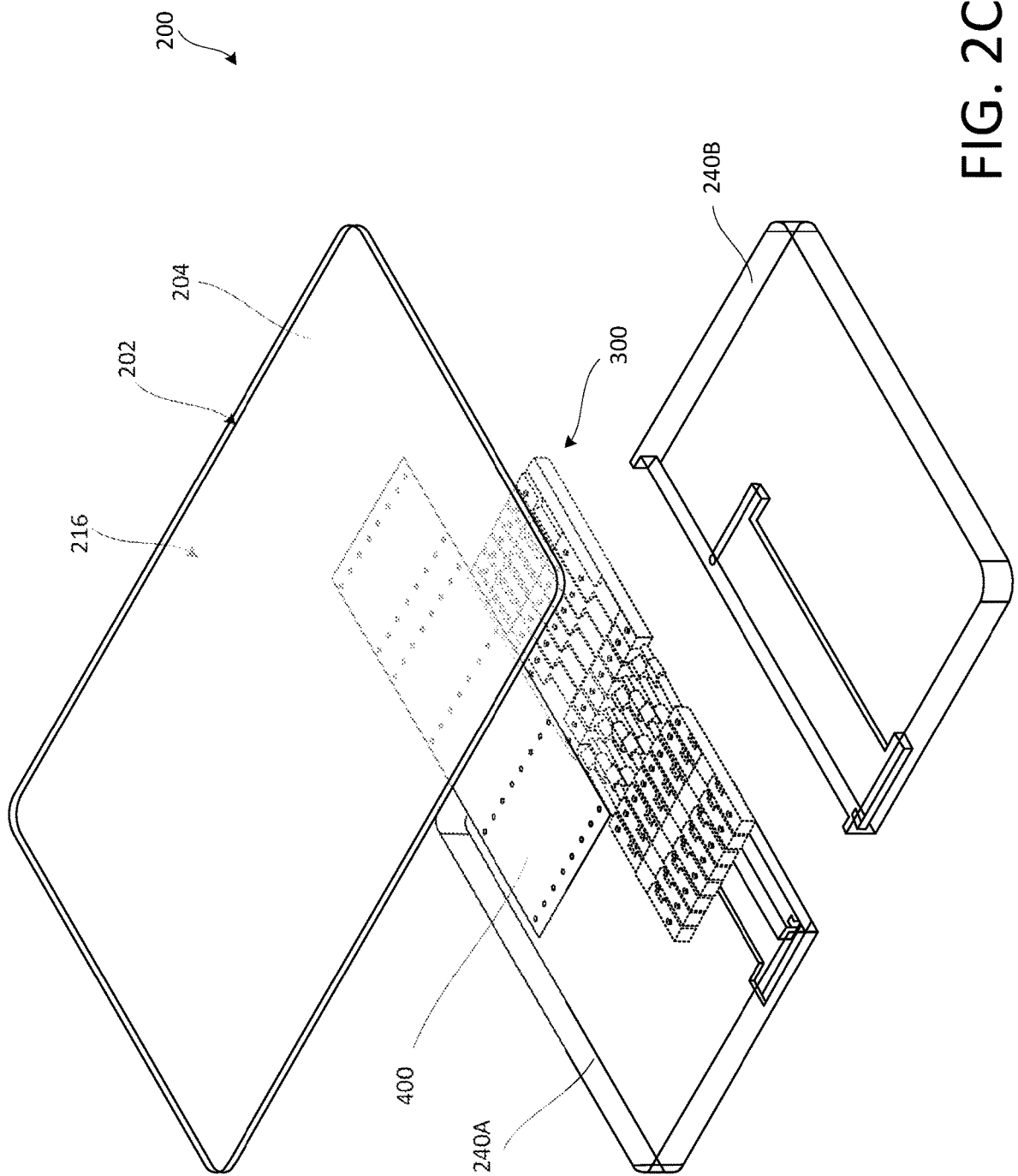
FIG. 2C is an exploded perspective view of the exemplary computing device shown in FIGS. 2A and 2B, in accordance with implementations described herein.

FIGS. 2A and 2B are perspective views, and FIG. 2C is an exploded perspective view, of an exemplary computing device 200 including a foldable layer 202, such as, for example, a foldable display 202, supported by an exemplary hinge mechanism 300, in accordance with implementations described herein. The exemplary hinge mechanism 300 may be received in a housing 240 of the computing device 200. The exemplary hinge mechanism may be positioned within the housing 240 at a position corresponding to a foldable portion 216, or bendable section 216, of the foldable display 202. For example, in some implementations, the hinge mechanism 300 may be positioned between a first housing 240A and a second housing 240B of the computing device 200. In FIG. 2A, the exemplary computing device 200 is in the folded configuration. In FIGS. 2B and 2C, the exemplary computing device 200 is in the unfolded configuration. In the exemplary computing device 200 shown in FIGS. 2A2C, the foldable display 202 is mounted on the computing device 200 so that a display surface 204 of the foldable display 202 faces outward when the device 200 is in the folded configuration. However, in some implementations, the foldable display 202 may be mounted so that the display surface 204 faces inward when the device 200 is in the folded configuration (not shown).

In the exemplary computing device 200 shown in FIGS. 2A-2C, the bendable section 216 of the foldable display 202 is at a central portion of the computing device 200, simply for purposes of discussion and illustration. In some implementations, the bendable section 216 may be located at positions other than the central portion of the computing device 200, and/or the foldable display 202 can include more bendable sections. In some implementations, the foldable display 202 can be substantially continuously bendable. In the exemplary foldable display 202 shown in FIGS. 2A-2C, the bendable section 216 allows the foldable display 202 to bend about an axis.

In some implementations, a bendable sheet 400 may be positioned between the hinge mechanism 300 and the foldable display 202. The bendable sheet 400 is illustrated in the exploded perspective view of the exemplary computing device 200 shown in FIG. 2C. The bendable sheet 400 is not visible in the views of the exemplary computing device 200 shown in shown in FIGS. 2A and 2B, so that the exemplary hinge mechanism 300 is more easily visible. In some implementations, the bendable sheet 400 may be made of, for example, a relatively thin sheet of metal material that is bendable together with the movement of the hinge mechanism 300. The bendable sheet 400 may provide support to the foldable display 202, throughout the range of motion of the hinge mechanism 300 and the foldable display 202. The bendable sheet 400 may reinforce the foldable display 202 for example, in response to an external impact and the like. The bendable sheet 400 may also improve planarity of the foldable display 202 in the unfolded configuration, particularly in the bendable section 216 of the foldable display 202, corresponding to a position of the hinge mechanism 300 in the housing 240. In some implementations, a thickness of the bendable sheet 400 may be, for example, approximately 0.1 mm. In some implementations, a thickness of the bendable sheet 400 may be greater than 0.1 mm. In some implementations, a thickness of the bendable sheet 400 may be less than 0.1 mm. In some implementations, a thickness of the bendable sheet 400 may be determined based on for example, a size of the foldable display 202, a thickness of the foldable display 202, an allowable bending radius of the foldable display 202, a material of the bendable sheet 400, and other such factors.

The hinge mechanism 300, in accordance with implementations described herein, may be located in the computing device 200, at a position corresponding to the bendable section 216 of the foldable display 202. The hinge mechanism 300 may support and guide the folding and the unfolding of the foldable display 202. That is, the hinge mechanism 300 may provide for a relatively natural folding and unfolding motion between the folded configuration shown in FIG. 2A and the unfolded configuration shown in FIG. 2B. In some implementations, the hinge mechanism 300 may change in length as components of the hinge mechanism 300 move relative to each other, for example, pivot or rotate relative to each other, and the computing device 200 is folded and unfolded. That is, in some implementations, the hinge mechanism may change in length so that the neutral axis (in particular, the neutral axis of the portions of the computing device 200 that are bending, such as the hinge mechanism 300 and the foldable display) can exist within, or essentially coincide with, the thin film transistor (TFT) layer of the foldable display 202, and thereby reduce or substantially eliminate tensile and/or compressive forces experienced by the fragile components at the TFT layer of the foldable display 202.

For example, in some implementations, a distance between the first housing 240A and the second housing 240B may change, for example, dynamically change, as the components of the hinge mechanism 300 move relative to each other and the computing device 200 is folded and unfolded. This change in distance between the first housing 240A and the second housing 240B may be generated by changes in distance between individual rod assemblies 390 of the hinge mechanism 300 (see FIGS. 4A-4C) as the computing device 200 is folded and unfolded. That is, an overall change in length of the hinge mechanism may be the sum of the changes in distance between adjacent rod assemblies 390 as the computing device 200 is folded and unfolded. This change in length of the hinge mechanism 300 may follow a path of motion of a neutral layer, or a neutral axis, of the foldable display 202 as the computing device 200 (and the foldable display 202) moves between the folded configuration and the unfolded configuration. In some implementations, the rate of change in length of the hinge mechanism 300 may be substantially synchronized with the neutral axis of the foldable display 202, to reduce or substantially eliminate tensile and/or compressive forces on the fragile components of the foldable display 202, thereby preventing damage to the foldable display 202. These changes in length as the computing device 200 is folded and unfolded, and the positioning of the neutral axis of the foldable display 202, will be described in more detail with respect to the schematic diagrams provided in FIGS. 3A and 3B.

FIG. 3A is a schematic view of an exemplary section of a foldable layer 22 in an unfolded configuration. FIG. 3B is a schematic view of the exemplary section of the foldable layer 22 in the folded configuration. In some implementations, a neutral axis 25, or a neutral layer 25, of the foldable layer 22 may be defined in a portion of the foldable layer 22 in which an unfolded length L of the foldable layer 22 is substantially equal to a folded length L of the foldable layer 22. For example, in some implementations, the neutral axis 25 of the foldable layer 22 may be between a first portion 26 of the foldable display 22 that is in compression in the folded configuration, and a second portion 28 of the foldable layer 22 that is in tension in the folded configuration. That is, in some implementations, the neutral axis 25 may be positioned along a portion of the foldable layer 22 that is neither in compression nor in tension when the foldable layer 22 is folded or bent. In some implementations, fragile components of the foldable layer 22 may be positioned along the neutral axis 25. Positioning of the fragile components along the neutral axis 25 of the foldable layer 22 may protect the fragile components from damage as the foldable layer 22 is folded and unfolded.

A hinge mechanism, in accordance with implementations described herein, may follow a path of motion of the neutral axis as the foldable layer moves between the folded configuration and the unfolded configuration, and the rate of change in length of the hinge mechanism may be synchronized with the neutral axis of the foldable layer, so that bending does not take place along the neutral axis as the foldable layer is folded and unfolded, and damage to the fragile components of the foldable layer may be prevented.

A computing device may include a hinge mechanism, in accordance with implementations described herein, that may support and guide a folding and an unfolding of a foldable display of the computing device, while also maintaining the foldable display within allowable bending limits, and while also providing for planarity in a bendable section of the foldable display in the unfolded configuration. A hinge mechanism, in accordance with implementations described herein, may include multiple pivot axes, and may provide for a change in length of the hinge mechanism, for example, corresponding to a distance between a first body (or housing) and a second body (or housing) of the computing device, to allow the first and second bodies to rotate about their respective centers of rotation. The rate of change in length of the hinge mechanism corresponding to the distance between the first and second bodies (or housings) of the computing device may be in synchronization with the neutral axis of the foldable display as it guides the folding and unfolding of the computing device. This may allow the foldable display, and in particular, the neutral axis of the foldable display, to maintain the bending, or folding, or rotating motion about its center of rotation, and avoid shifting of the neutral axis, thus avoiding undue stress on fragile components of the foldable display.

Figure 4A:
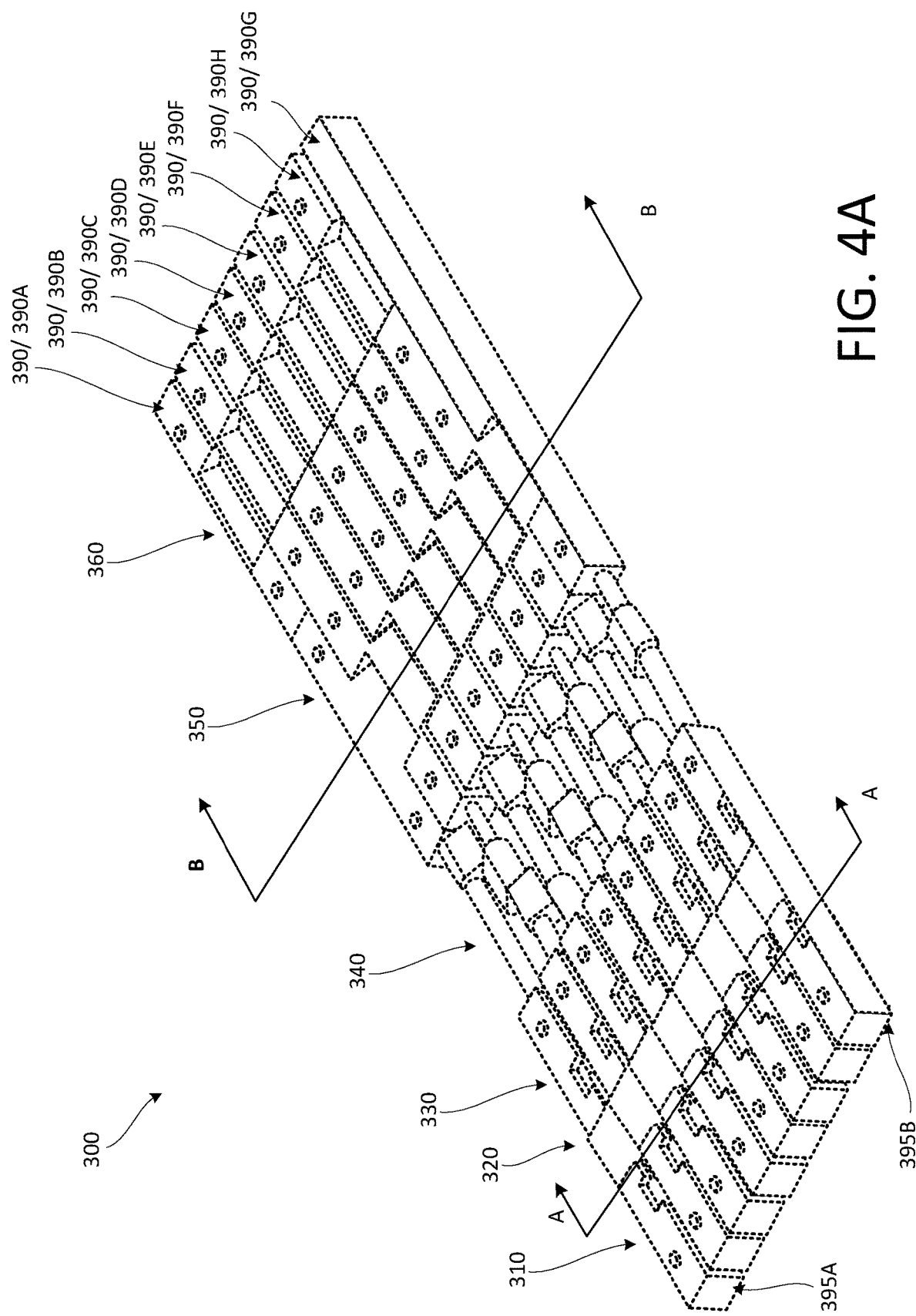
FIG. 4A is a perspective view of an exemplary hinge mechanism, in an unfolded configuration, in accordance with implementations described herein.
Figure 4B:
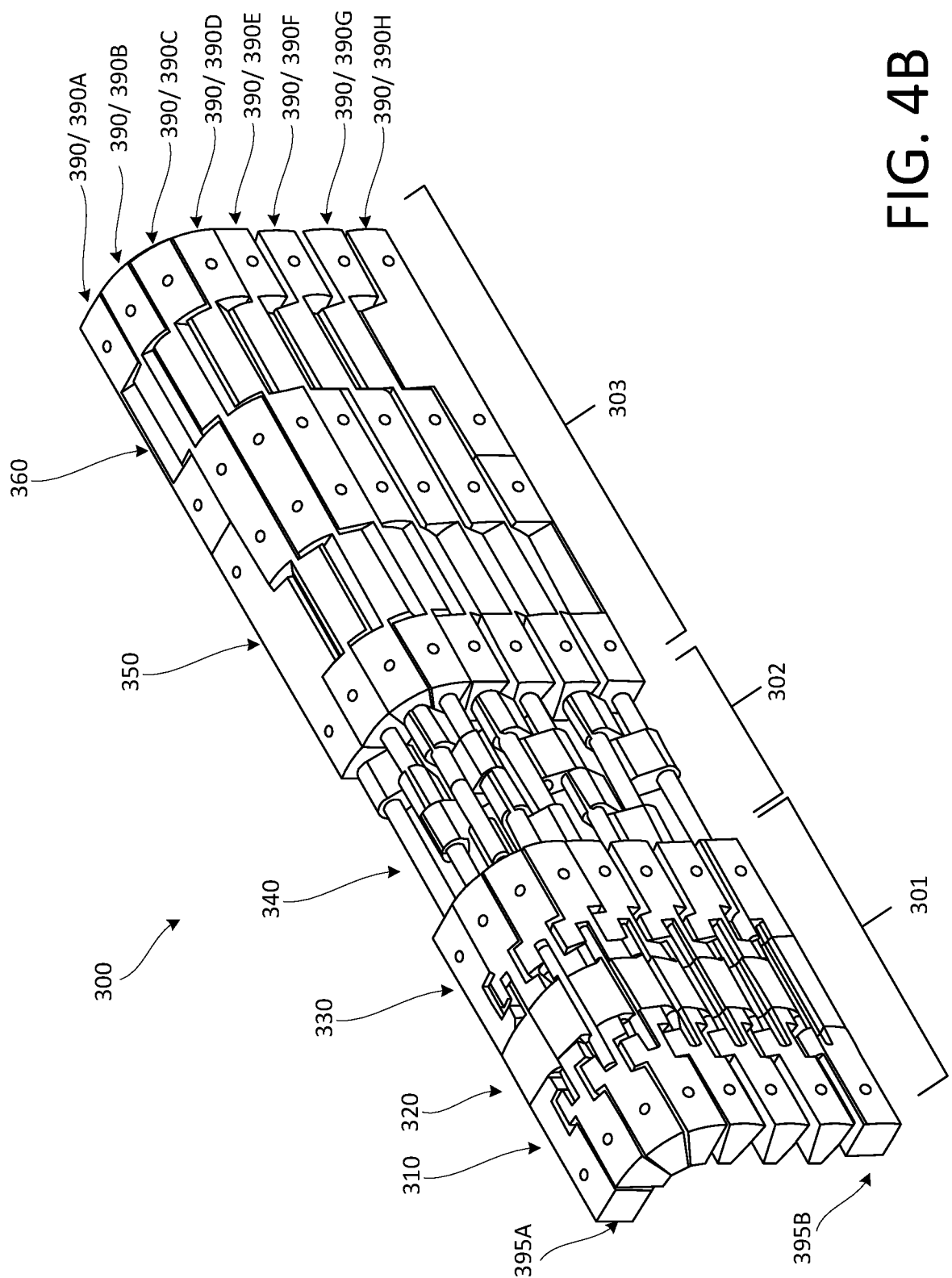
FIG. 4B is a perspective view of the exemplary hinge mechanism shown in FIG. 4A, in a partially folded configuration, in accordance with implementations described herein.
Figure 4C:
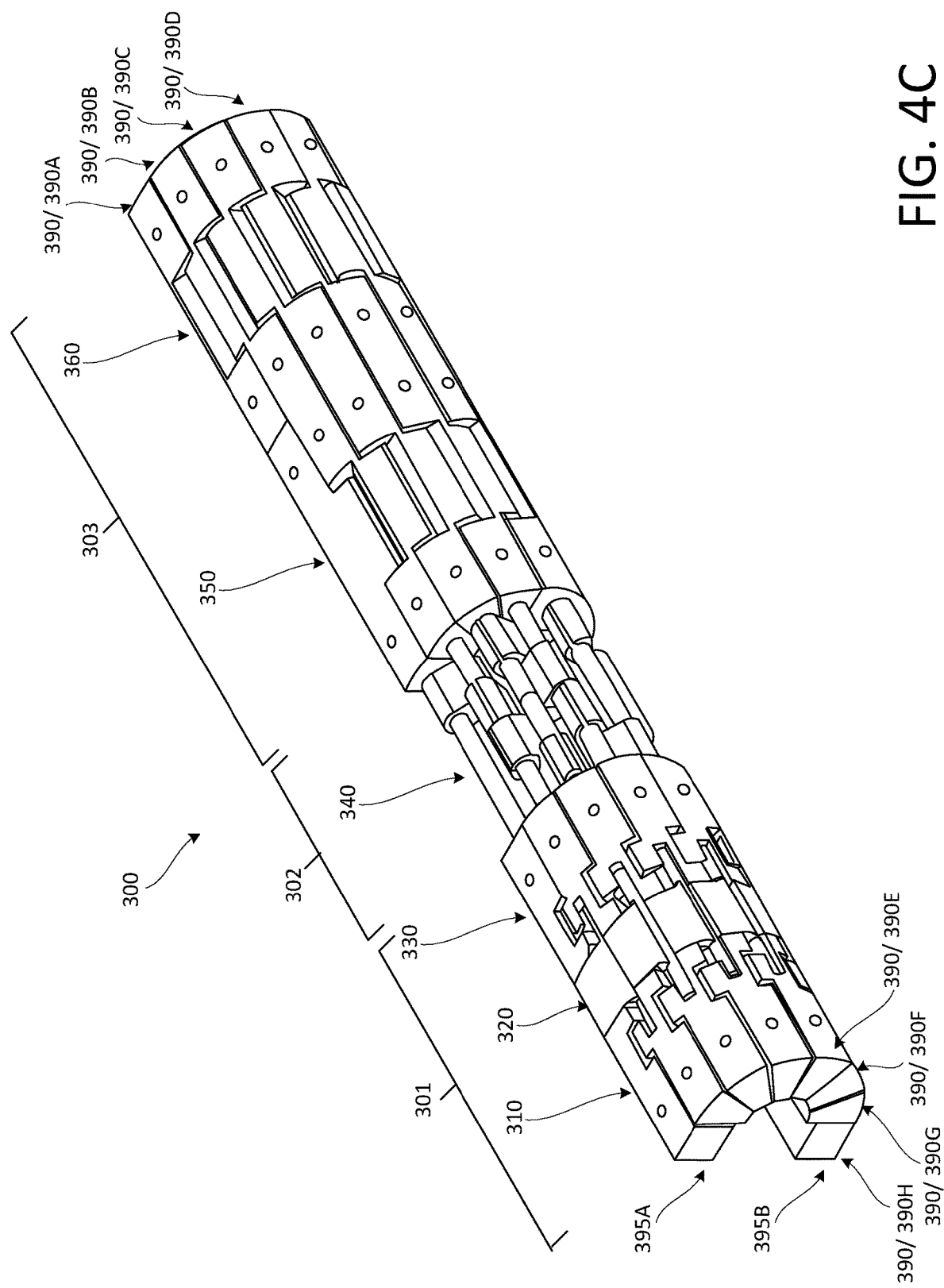
FIG. 4C is a perspective view of the exemplary mechanism shown in FIGS. 4A and 4B, in a fully folded configuration, in accordance with implementations described herein.

FIGS. 4A through 4C are perspective views of an exemplary hinge mechanism 300, in accordance with implementations described herein. In particular, FIG. 4A is a perspective view of the exemplary hinge mechanism 300 in an unfolded configuration. FIG. 4C is a perspective view of the exemplary hinge mechanism 300 in an unfolded configuration. FIG. 4B is a perspective view of the exemplary hinge mechanism 300, in an interim configuration, or transitional configuration, or partially folded configuration, between the unfolded configuration shown in FIG. 4A and the fully folded configuration shown in FIG. 4C.

As shown in FIGS. 4A-4C, a hinge mechanism 300, in accordance with implementations described herein, may include a plurality of hinge members 390, or link members 390, or hinge beams 390, or rod assemblies 390. In the example shown in FIGS. 4A-4C, the exemplary hinge mechanism 300 includes eight exemplary rod assemblies 390 (first through eighth rod assemblies 390A, 390B, 390C, 390D, 390E, 390F, 390G and 390H), simply for purposes of discussion and illustration. A hinge mechanism 300, in accordance with implementations described herein, may include more, or fewer rod assemblies 390. A number of rod assemblies 390 included in the hinge mechanism 300 may be based on, for example, a form factor of the foldable display 202 and/or the computing device 200, a range of motion of the bendable section 216 of the foldable display 202, an allowable bending radius of the foldable display 202, a form factor of each of the rod assemblies 390, and other such factors.

Each of the rod assemblies 390 may define a corresponding axis, or pivot point, that guides the folding and unfolding of the hinge mechanism 300, and the foldable display 202 coupled thereto. In some implementations, brackets 395 may couple the arrangement of rod assemblies 390 to corresponding portions of a computing device, such as, for example, to the housing 240 of the exemplary computing device 200 shown in FIGS. 2A-2C. As shown in the exemplary arrangement illustrated in FIGS. 4A-4C, in some implementations, the first rod assembly 390A (of the plurality of rod assemblies 390) may function as a first bracket 395A at a first end of the arrangement of rod assemblies 390, to couple the arrangement of rod assemblies 390 to, for example, the first body 240A of the exemplary computing device 200. Similarly, as shown in the exemplary arrangement illustrated in FIGS. 4A-4C, the eighth rod assembly 390H may function as a second bracket 395B at a second end of the arrangement of rod assemblies 390, to couple the arrangement of rod assemblies 390 to, for example, the second body 240B of the exemplary computing device 200.

Figure 5A:
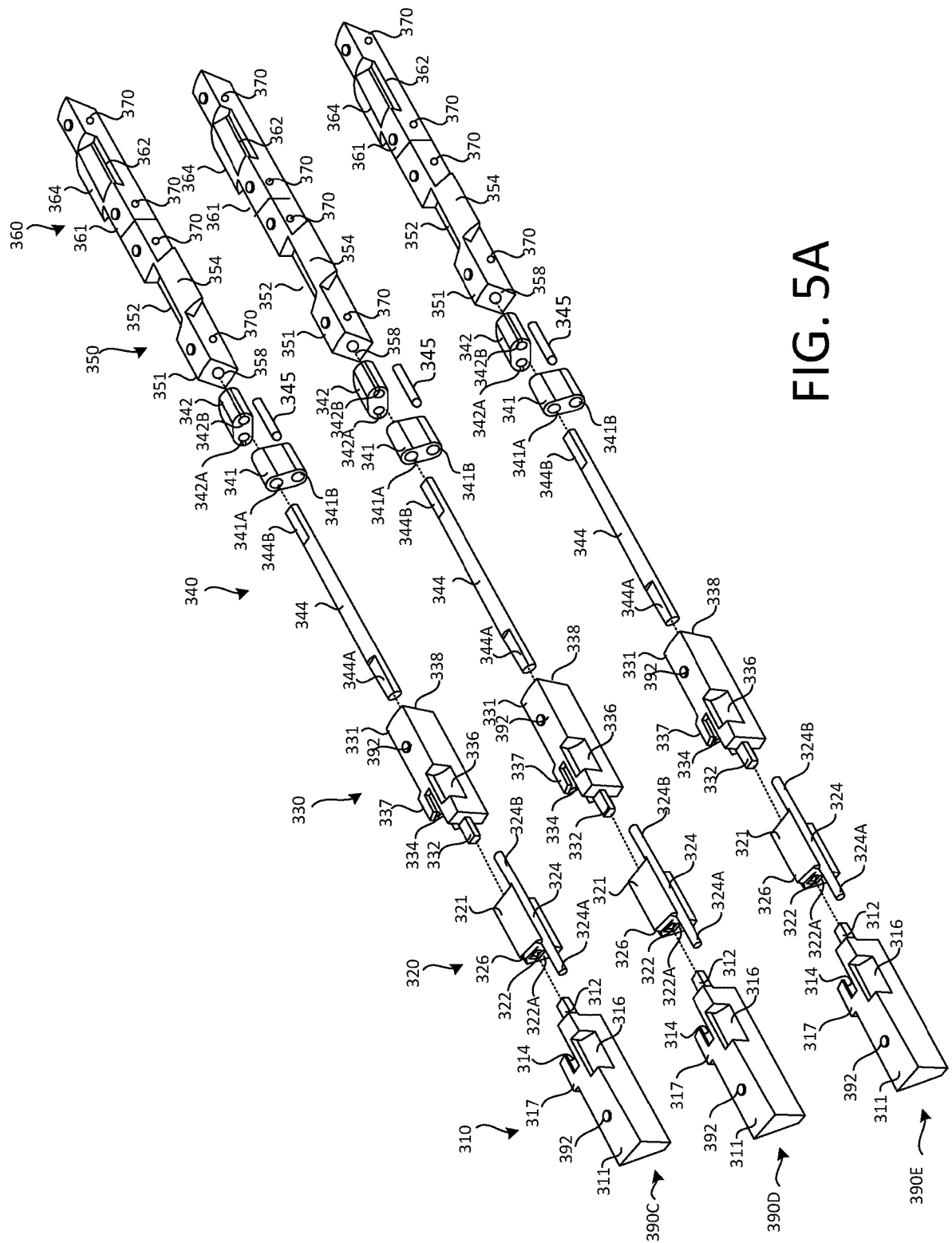

FIG. 5A is an exploded perspective view of three exemplary rod assemblies 390, of the plurality of rod assemblies 390 included in the exemplary hinge mechanism 300 shown in FIGS. 4A-4C. In particular, FIG. 5A illustrates three of the exemplary rod assemblies 390B, 390C and 390D, simply for ease of discussion and illustration. The features of, and the interaction amongst, the exemplary rod assemblies 390B, 390C and 390D to be described below shown in FIG. 5A may be applied to each of the plurality of rod assemblies 390 included in the hinge mechanism 300. FIG. 5B is a perspective view of an interface between an exemplary first segment 310 and an exemplary second segment 320 of the plurality of rod assemblies 390, in accordance with implementations described herein In some implementations, the hinge mechanism 300 may include multiple sections, each of the sections providing a particular functionality of the hinge mechanism 300 that allow the hinge mechanism 300 to support and guide the movement of the foldable display 202 in the manner to be described. For example, in some implementations, a first section 301 of the hinge mechanism 300 may support and guide a sequential pivoting motion of each of the plurality of rod assemblies 390. A second section 302 of the hinge mechanism 300 may include linkages that coupled each of the plurality of rod assemblies 390 to at least one adjacent rod assembly 390, to provide for the coordinated movement of the plurality of rod assemblies 390. A third section 303 of the hinge mechanism 300 may define stopping mechanisms, for example a first stopping mechanism that restricts bending or movement of the plurality of rod assemblies 390 beyond a minimum allowable bending radius of the foldable display 202, and a second stopping mechanism that restricts bending or movement of the plurality of rod assemblies 390 beyond a maximum allowable bending radius of the foldable display 202. The exemplary first, second and third sections 301, 302, 303 of the hinge mechanism 300 may be positioned in the hinge mechanism 300 as necessary to provide support and guide movement of a particular foldable display 202, and the arrangement of the first, second and third sections 301, 302, 303 within the hinge mechanism 300 may be adjusted as necessary.

As shown in FIGS. 4A through 5A, each rod assembly 390 may include a plurality of segments that are arranged longitudinally, and that are coupled, or joined, or connected, to form the rod assembly 390. In the exemplary arrangement shown in FIGS. 4A-4C and 5A, each rod assembly 390 may include a first segment 310, a second segment 320, a third segment 330, a fourth segment 340, a fifth segment 350, and a sixth segment 360. The segments 310, 320, 330, 340, 350, 360 of the rod assembly 390 may be longitudinally arranged, and coupled, for example, movably coupled, to an adjacent segment, to provide for both the coordinated movement of the segments 310, 320, 330, 340, 350, 360 of the hinge mechanism 300, and the coordinated movement of the plurality of rod assemblies 390 to produce the dynamic change in length of the hinge mechanism 300, to coincide with the folding and unfolding of the neutral axis of the foldable display 202. In some implementations, the first section 301 of the hinge mechanism 300 may be defined by the first segment 310, the second segment 320 and the third segment 330 of the plurality of rod assemblies 390. In some implementations, the second section 302 of the hinge mechanism 300 may be defined by the fourth segment 340 of the plurality of rod assemblies 390. In some implementations, the third section 303 of the hinge mechanism 300 may be defined by the fifth segment 350 and the sixth segment 360.

The first segment 310 may include body 311, with a shaft 312 extending outward from an end portion of the body 311. A guide slot 314 may be formed in a protrusion 317 formed on a first side portion of the body 311, proximate the shaft 312. A guide recess 316 may be formed in a second side portion of the body 311, opposite the first side portion thereof, proximate the shaft 312. The second segment 320 may include a body 321, with a slot 322 extending through the body 321. A guide pin 324 may be provided on a first side portion of the body 321, and a guide recess 326 may be defined on a second side portion of the body 321, opposite the first side portion thereof. The third segment 330 may include a body 331, with a shaft 332 extending outward from an end portion of the body 331. A guide slot 334 may be formed in a protrusion 337 formed on a first side portion of the body 331, proximate the shaft 332. A guide recess 336 may be formed in a second side portion of the body 311, opposite the first side portion thereof, proximate the shaft 332.

In an assembled state of each of the rod assemblies 390, the shaft 312 of the first segment 310 may be inserted into and received in the opening 322A of the slot 322 formed in the second segment 320. Similarly, the shaft 332 of the third segment 330 may be inserted into and received in an opening 322B in a second end portion of the slot 322 formed in the second segment 320. In some implementations, a cross-sectional shape, or an outer peripheral contour, of the shaft 312 of the first segment 310 may correspond to a shape, or an inner peripheral contour, of the opening 322A of the slot 322 in the second segment 320. Similarly, a cross-sectional shape, or an outer peripheral contour, of the shaft 332 of the third segment 330 may correspond to a shape, or an inner peripheral contour, of the opening 322B of the slot 322 in the second segment 320. In some implementations, the cross-sectional shape, or peripheral contour, of the shafts 312, 332 and corresponding shape(s)/contour(s) of the slot 322 may define a fixing feature, or a locking feature, that restricts relative rotation of the first, second and third segments 310, 320, 330, such that the first, second and third segments 310, 320, 330 rotate together.

For example, as shown in the exemplary arrangement illustrated in FIGS. 5A and 5B, in some implementations, the shafts 312, 332 may have a D shaped cross-section, or outer peripheral contour, corresponding to a D shaped opening, or inner peripheral contour, of the slot 322. In this exemplary implementation, the contours of the shafts 312, 332 and the openings 322A, 322B (for example, the flat surface portion of the shafts 312, 332 and the flat surface portion of the openings 322A, 322B) may serve as a locking feature, or an anti-rotation feature, which causes the first, second and third segments 310, 320, 330 of a particular rod assembly 390 to rotate together. The shafts 312, 332 and the slot 322 may have other shape(s) and/or contour(s). The shape(s), or contour(s), of the shafts 312, 332 and the slot 322, may fixedly couple the first, second and third segments 310, 320, 330, thus maintaining a relative position of the first, second and third segments 310, 320, 330, and restricting relative rotation of the first, second and third segments 310, 320, 330.

In the exemplary assembled state shown in FIGS. 4A-4C, a first portion 324A of the guide pin 324 of the second segment 320 may be received in the guide slot 314 of the first segment 310 of the adjacent rod assembly 390. Similarly, a second portion 324B of the guide pin 324 of the second segment 320 may be received in the guide slot 334 of the third segment 330 of the adjacent rod assembly 390. For example, in the assembled state, the first portion 324A of the guide pin 324 of the second segment 320 of the third rod assembly 390C may be received in the guide slot 314 of the first segment 310 of the fourth rod assembly 390D; and the second portion 324B of the guide pin 324 of the second segment 320 of the third rod assembly 390C may be received in the guide slot 334 of the third segment 330 of the adjacent fourth rod assembly 390D.

With the guide pin 324 of the second segment 320 received in the guide slots 314, 334 of the adjacent rod assembly 390 in this manner, the protrusion 317 of the first segment 310 may be movably received in the guide recess 316 of the first segment 310 of the adjacent rod assembly 390; the protrusion 337 of the third segment 330 may be movably received in the guide recess 336 of the adjacent rod assembly 390; and a central portion of the guide pin 324 may be movably received in the guide recess 326 of the second segment 320 of the adjacent rod assembly 390. For example, in the assembled state, the protrusion 317 of the first segment 310 of the third rod assembly 390C may be movably received in the guide recess 316 of the first segment 310 of the second rod assembly 390B, and the protrusion 337 of the third segment 330 of the third rod assembly 390C may be movably received in the guide recess 336 of the third segment 330 of the second rod assembly 390B. The central portion of the guide pin 324 of the second segment 320 of the third rod assembly 390C may be movably received in the guide recess 326 of the second segment 320 of the fourth rod assembly 390D.

In some implementations, the coupling and interaction of the first, second and third segments 310, 320, 330 of each of the plurality of rod assemblies 390 in this manner, to define the first section 301 of the hinge mechanism 300, may trigger the sequential pivoting of each of the rod assemblies 390 about its respective pivot axis, and may define, and in some implementations may limit, a motion of the hinge mechanism 300. A sequential pivoting may be considered to be a folding or bending around more than one pivoting axis, i.e. first there is pivoting around a first axis, then around a second axis resulting in a sequence of pivot movements. In some implementations, the coupling and interaction of the first, second and third segments 310, 320, 330 in this manner may maintain the hinge mechanism 300, and the foldable display 202 coupled thereto, within a desired shape or contour, which in turn may maintain an allowable bending radius of the foldable display 202. In some implementations, a shape of the guide slot 314 formed in the first segment 310, and a shape of the guide slot 334 formed in the third segment 330, may guide the movement of the guide pin 324 of the second segment 320 received in the guide slots 314, 334, so that a desired shape of the hinge mechanism (and the foldable display 202 coupled thereto) may be maintained.

The fourth segment 340, defining the second section of the hinge mechanism 300, may include one or more linkages mounted on a rod 344. In the exemplary hinge mechanism 300 shown in FIGS. 4A-4C, the exemplary rod assemblies 390A and 390H each include one linkage mounted on the respective rod 344. Due to the positioning of the rod assemblies 390A and 390H at opposite ends of the arrangement of rod assemblies 390, the rod assembly 390A is only directly coupled by a linkage to the adjacent rod assembly 390B, and the rod assembly 390H is only directly coupled by a linkage to the adjacent rod assembly 390G. In contrast, the exemplary rod assemblies 390B, 390C, 390D, 390E, 390F and 390G include two linkages mounted on the rod 344, as each of the rod assemblies 390B, 390C, 390D, 390E, 390F and 390G are coupled to two adjacent rod assemblies 390 (i.e., one rod assembly 390 on each side thereof). Operation of fourth segment 340 including the linkage(s) mounted on the rod 344 will be described below with respect to the linkages 390B, 390C and 390D, simply for ease of discussion and illustration.

The rod 344 may have a first end portion 344A that is fitted into a slot 338 defined in a second end portion of the body 331 of the third segment 330, opposite the first end portion of the third segment 330 at which the shaft 332 is formed. A second end portion 344B of the rod 344 may be fitted into a slot 358 formed in an end portion of the fifth segment 350. In some implementations, a first linkage 341 and a second linkage 342 may be mounted on the rod 344. The first linkage 341 may include a first passage 341A and a second passage 341B, each extending through the linkage 341. In some implementations, the second passage 341B may be oriented substantially in parallel to the first passage 341A. The second linkage 342 may include a first passage 342A and a second passage 342B, each extending through the linkage 342. In some implementations, the second passage 342B may be oriented substantially in parallel to the first passage 342A.

As shown, for example, in FIGS. 4A-4C and 5A, in some implementations, for each of the rod assemblies 390, the respective rod 344 (of the particular rod assembly 390) may extend through the first passage 341A formed in the first linkage 341, and through the first passage 342A formed in the second linkage 342, to mount the first and second linkages 341, 342 on the rod 344, between the third segment 330 and the fifth segment 350. The second passage 341B of the first linkage 341 may be coupled with one of the first linkage 341 or the second linkage 342 of an adjacent rod assembly 390 positioned at a first side of the rod assembly (via the respective second passage 341B/342B). Similarly, the second passage 342B of the second linkage 342 may be coupled with one of the first or second linkage 341, 342 of an adjacent rod assembly 390 positioned at a second side of the rod assembly (via the respective second passage 341B/342B). In this manner, each set of linkages 341, 342 may couple the respective rod assembly 390 to a pair of adjacent rod assemblies 390 (i.e., to a first rod assembly 390 at a first side thereof, and to a second rod assembly at a second side thereof). Interaction of the linkages 341, 342 mounted on the rods 344 of the fourth segment 340 of adjacent rod assemblies 390 will be described with respect to the second, third and fourth rod assemblies 390B, 390C and 390D, simply for ease of discussion. However, the principles to be described with respect to the fourth segment 340, and in particular to the linkages 341, 342 mounted on the rods 344, may be applied to each of the rod assemblies 390 included in the hinge mechanism 300.

As shown in the exemplary implementation illustrated in FIGS. 4A through 5A, the rod 344 of the third rod assembly 390C may extend through the first passage 341A of the first linkage 341 and the first passage 342A of the second linkage 342 (of the third rod assembly 390C). The second passage 341B of the first linkage 341 (of the third rod assembly 390C) may be coupled to the second passage 341B of the first linkage 341 of the adjacent second rod assembly 390B. In some implementations, the second passages 341B of the respective first linkages 341 of the second and third rod assemblies 390B, 390C may be coupled by a connecting pin 345 fitted in the respective second passages 341B. Similarly, the second passage 342B of the second linkage 342 (of the third rod assembly 390C) may be coupled to the second passage 342B of the second linkage 342 of the adjacent fourth rod assembly 390D. In some implementations, the second passages 342B of the respective second linkages 342 of the third and fourth rod assemblies 390C, 390D may be coupled by a connecting pin 345 fitted in the respective second passages 342B. In this manner, the second, third and fourth rod assemblies 390B, 390C, 390D may be linked. The remaining sets of adjacent rod assemblies 390 may be paired, or linked, in a similar manner.

In some implementations, one, or both, of the linkages 341, 342 of each of the rod assemblies 390 may be, for example, C-slot linkages. For example, in some implementations, one, or both, of the first passages 341A, 342A may be C-slot passages that allow for an interference fit between the rod 344 and the respective linkage 341, 342. In some implementations, one, or both, of the second passages 341B, 342B may be C-slot passages that allow for an interference fit between the connecting pin 345 and the linkages 341, 342. The interference fit may generate friction to resist relative movement of the adjacent rod assemblies 390. The friction generated may maintain a position of the computing device 200 and the foldable display 202 at a plurality of positions between the fully open and the fully closed configurations. The friction generated may also help to guide the folding and unfolding movement of the computing device 200 and the foldable display 202. This arrangement may also have an advantage in that this arrangement incorporates friction into the hinge mechanism 300 in a manner that is coaxial with the plurality of pivot points of the hinge mechanism 300 that are respectively defined by the plurality of rod assemblies 390.

The fifth segment 350 may include a body 351, with a recess 352 defined in a first side portion of the body 351, and a ramped surface 354, or a ramped protrusion 354, defined on a second side portion of the body 351. The protrusion 354 of a particular rod assembly 390 may be received in the recess 352 of an adjacent rod assembly 390, such that interaction between mating surfaces of the protrusion 354 and the recess 352 of the adjacent rod assembly 390 may guide, and limit or restrict, movement in the folding and the unfolding of the computing device 200 and the foldable display 202 coupled thereto. For example, in some implementations, the interaction of the protrusion 354 of a rod assembly 390 with the recess 352 of the adjacent rod assembly 390 may define a first stopping mechanism of the third section 303 of the hinge mechanism 300 that limits relative movement of the plurality of rod assemblies 390 to limit bending of the foldable display 202 beyond a minimum bending radius of the foldable display 202.

The sixth segment 360 may include a body 361, with a ramped surface 364, or a ramped protrusion 364, defined on a first side portion of the body 361, and a recess 362 defined in a second side portion of the body 361. The protrusion 364 of a particular rod assembly 390 may be received in the recess 362 of an adjacent rod assembly 390, such that interaction between mating surfaces of the protrusion 364 and the recess 362 of the adjacent rod assembly 390 may guide, and limit or restrict, movement in the folding and the unfolding of the computing device 200 and the foldable display 202 coupled thereto. For example, in some implementations, the interaction of the protrusion 364 of a rod assembly 390 with the recess 362 of the adjacent rod assembly 390 may define a first stopping mechanism of the third section 303 of the hinge mechanism 300 that limits relative movement of the plurality of rod assemblies 390 to limit bending of the foldable display 202 beyond a maximum bending radius of the foldable display 202.

In some implementations, the fifth segment 350 and the sixth segment of the rod assembly 390 may be coupled, for example, fixedly coupled, such that the fifth and sixth segments 350, 360 move together. he fixed coupling of the fifth segment 350 and the sixth segment 360 may allow the fifth and sixth segments 350, 360 to rotate together. In some implementations, the fifth and sixth segments 350, 360 maybe fixedly coupled by, for example, a contoured fitting (for example, as described above with respect to the first, second and third segments 310, 320, 330), bonding, welding, and other such coupling mechanisms which may fixedly couple the fifth and sixth segments 350, 360. In some implementations, the fifth and sixth segments 350, 360 may be fabricated as a single part or unit.

In some implementations, one or more channels 370 may extend through the fifth segment 350 of each of the plurality of rod assemblies 390. In some implementations, one or more channels 370 may extend through the sixth segment 360 of each of the plurality of rod assemblies 390. In some implementations, cables may be routed through one or more of the channels 370, to provide for electrical connection, and data connection, power transmission and the like, between components received in the first housing 240A of the computing device 200 and components received in the second housing 240B of the computing device 200.

As noted above, the bendable sheet 400 may be interposed between the hinge mechanism 300 and the foldable display 202 to provide support to the foldable display 202 through the range of motion of the hinge mechanism 300 and the foldable display 202. The bendable sheet 400 may also to provide for a relatively smooth interface between the hinge mechanism 300 and the foldable display 202, so that surface inconsistencies between rod assemblies 390 of the hinge mechanism 300 (i.e., ridges, seams and the like) are not felt by the user as the user interacts with, or touches, a corresponding portion of the foldable display 202. In some implementations, one or more of the rod assemblies 390 may include attachment features 392, or attachment points 392, on a surface thereof facing the bendable sheet 400. In the exemplary implementation illustrated in FIGS. 4A through 5B, an attachment feature 392, or attachment point 392, is shown on the first segment 310, and another attachment feature 392, or attachment point 392, is shown on the third segment 330, simply for purposes of discussion and illustration. The hinge mechanism 300 may include more, or fewer, attachment features 392, or attachment points 392, on more, or fewer, of the rod assemblies 390. In some implementations, an adhesive may adhere the bendable sheet 400 to the hinge mechanism 300 at the attachment feature(s) 392, or attachment point(s) 392.

Interaction of the components of the plurality of rod assemblies 390 of the hinge mechanism 300, in accordance with implementations described herein, as the exemplary computing device 200 including the exemplary foldable display 202 is moved between the folded configuration shown in FIG. 2A and the unfolded configuration shown in FIG. 2B, will be described with respect to FIGS. 6A through 7C.

Figure 6A:
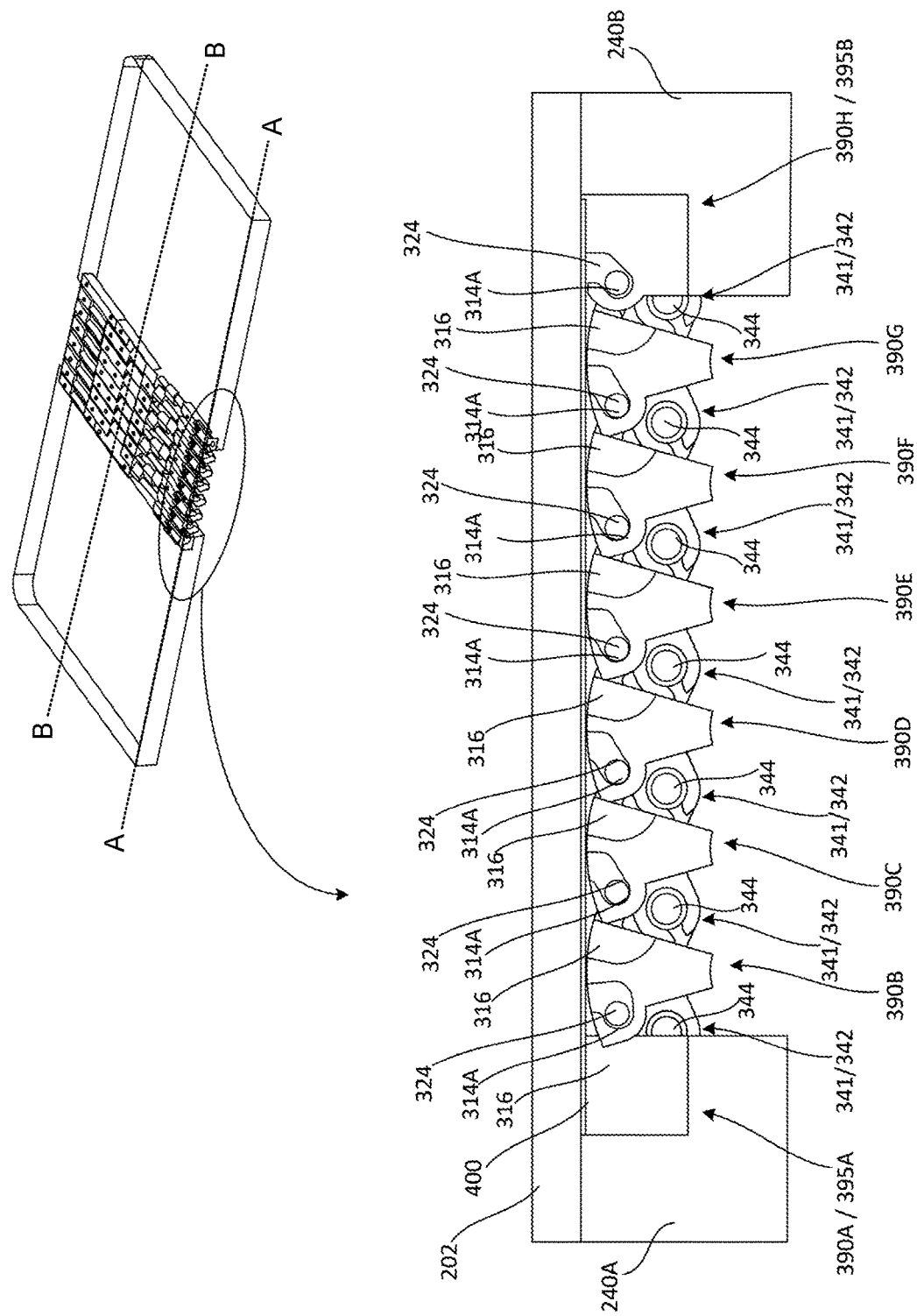
FIGS. 6A-6C are cross-sectional views of the exemplary hinge mechanism shown in FIGS. 4A-5B, taken along line A-A of FIG. 4A.
Figure 6B:
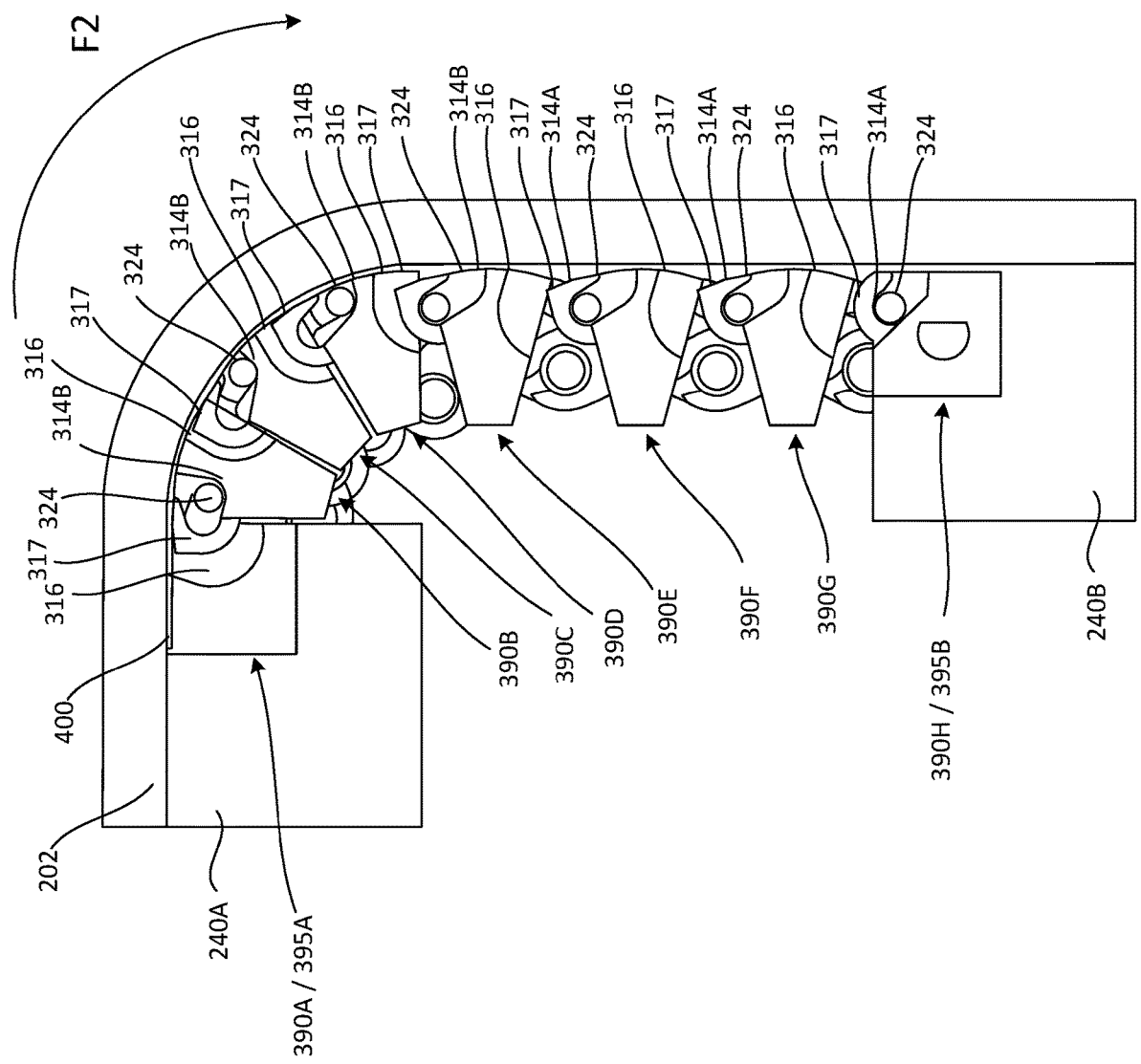
Figure 6C:
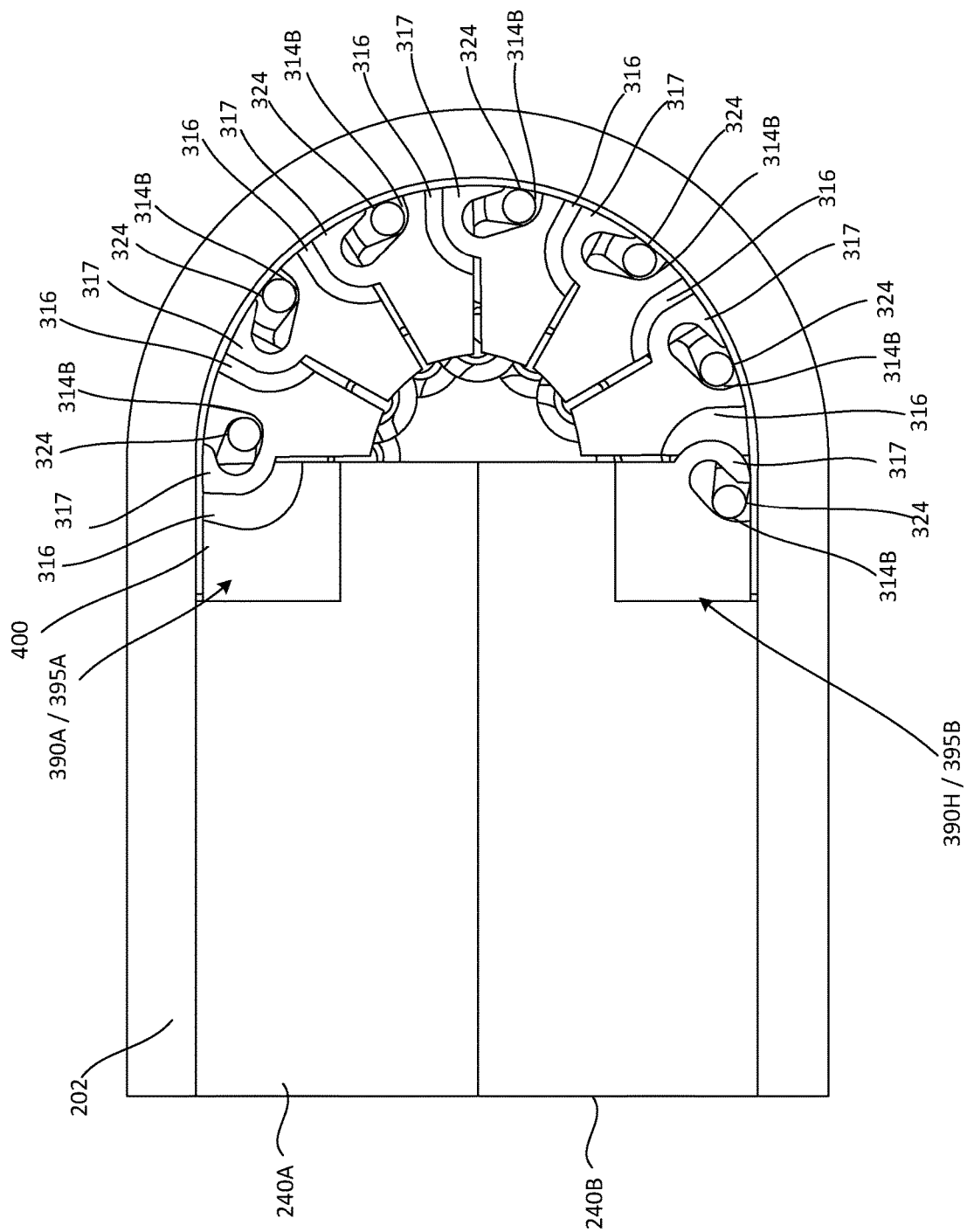
Figure 7A:
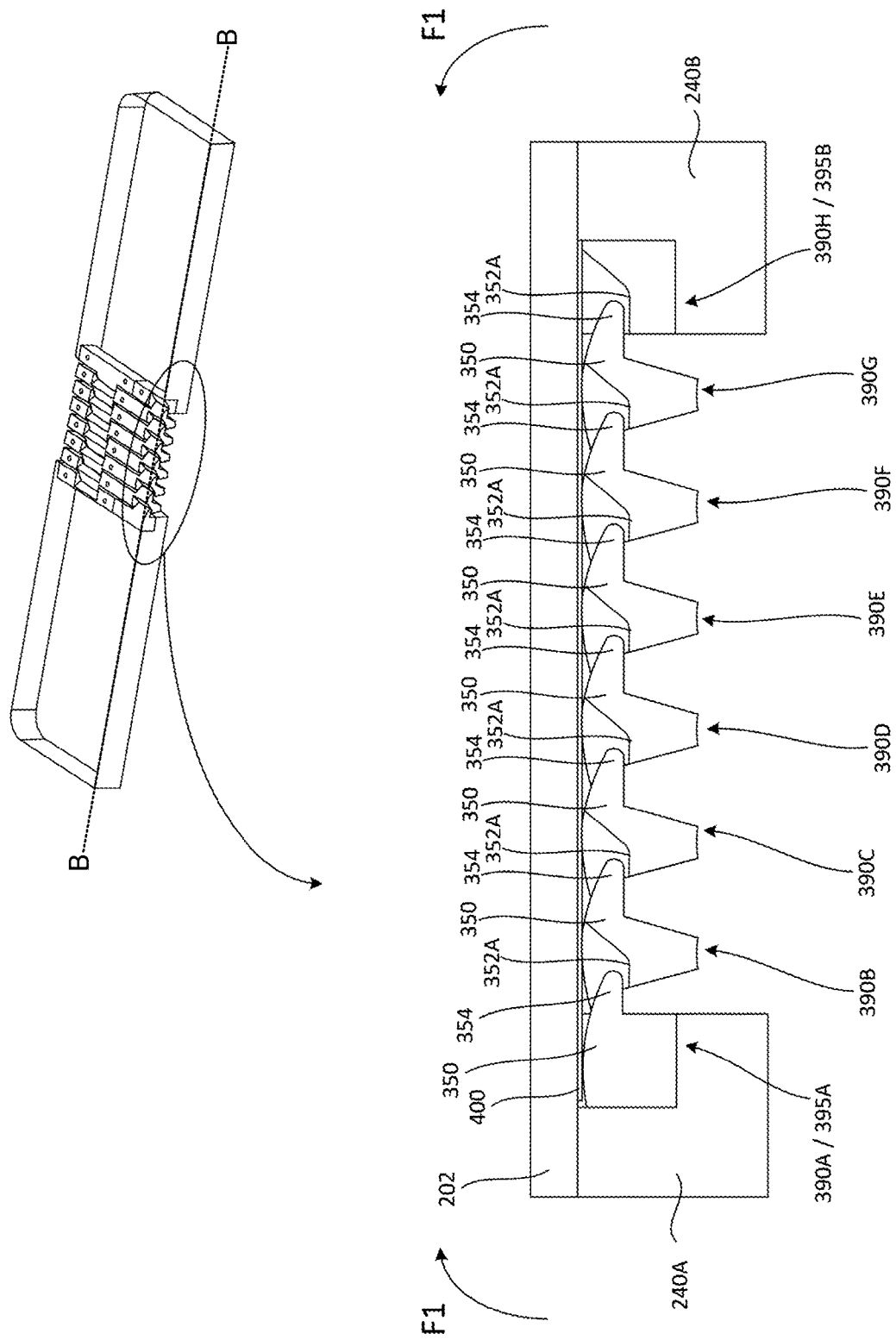
FIGS. 7A-7C—sectional views of the exemplary hinge mechanism shown in FIGS. 4A-5B, taken along line B-B of FIG. 4A.
Figure 7B:
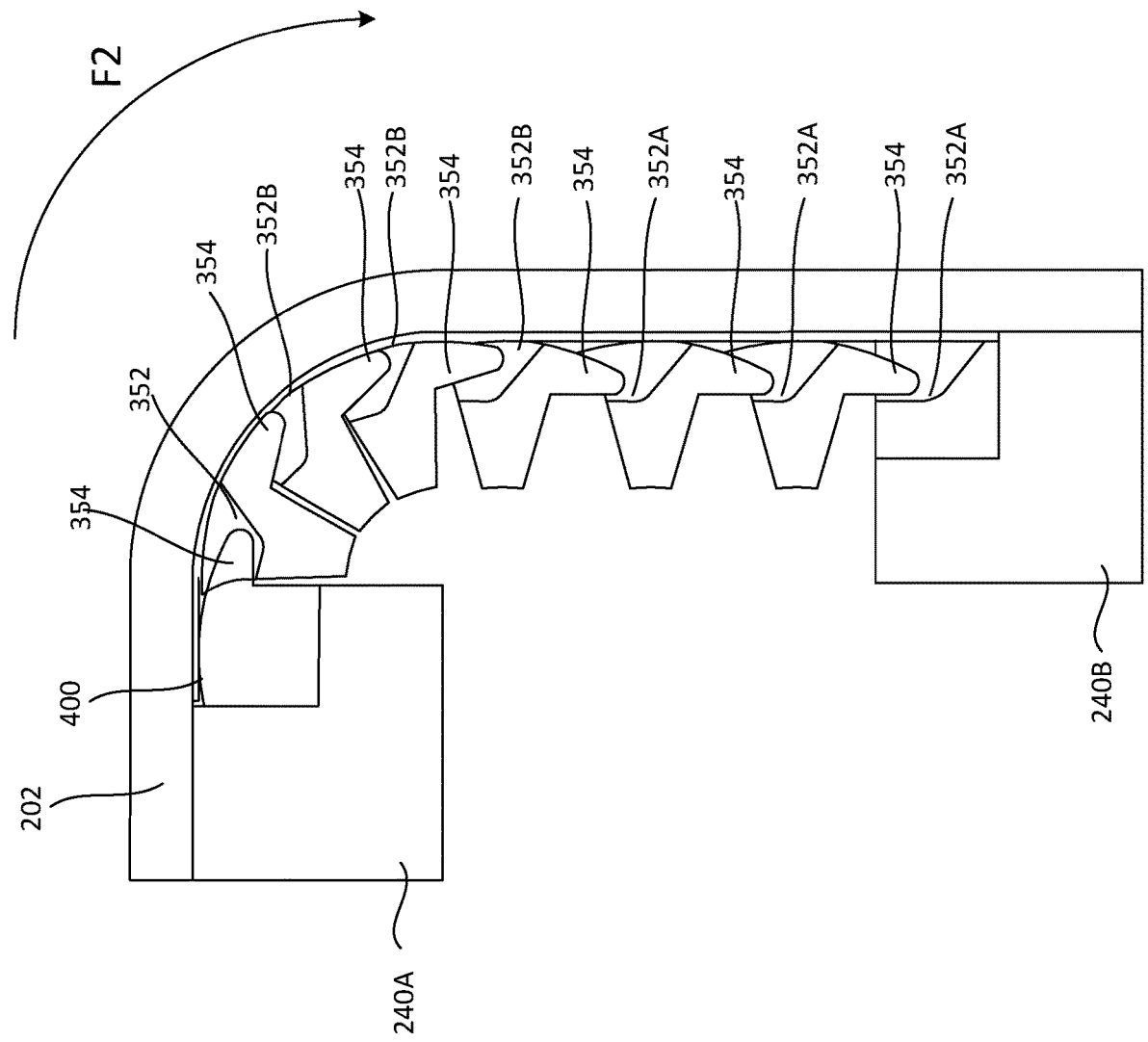
Figure 7C:
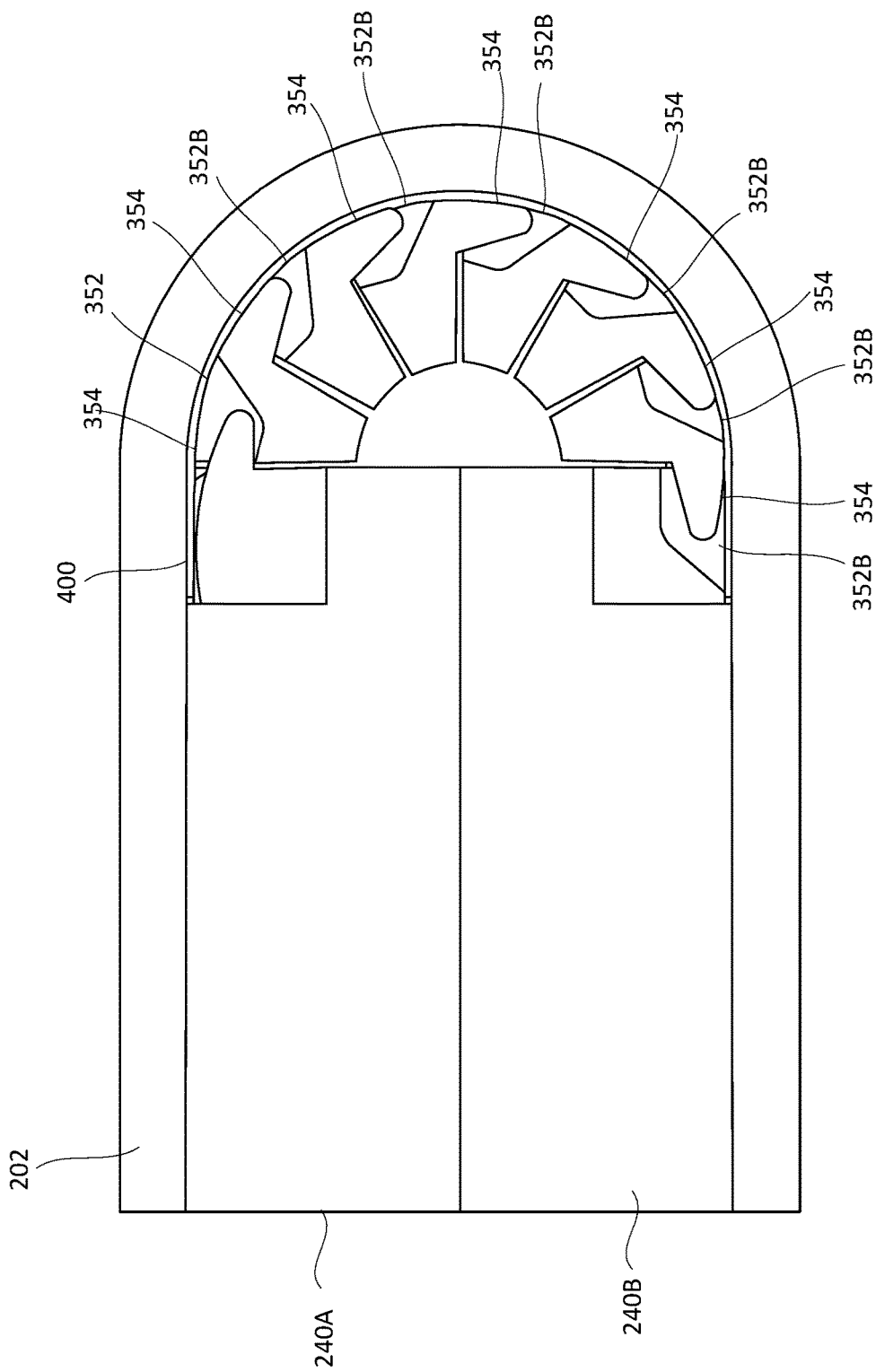

FIGS. 6A-6C are cross-sectional views of the exemplary hinge mechanism 300, taken along line A-A of FIG. 4A. FIGS. 7A-7C are cross-sectional views of the exemplary hinge mechanism 300, taken along line B-B of FIG. 4A.

FIGS. 6A and 7A illustrate the relative positioning of the components of the hinge mechanism 300 in the unfolded configuration of the exemplary computing device 200. in the unfolded configuration. FIGS. 6C and 7C illustrate the relative positioning of the components of the hinge mechanism 300 in the folded configuration of the exemplary computing device 200. FIGS. 6B and 7C illustrate the relative positioning of the components of the hinge mechanism 300 at an interim position between the unfolded configuration and the folded configuration.

As shown in FIG. 6A, in the unfolded configuration, each of the guide pins 324 (e.g., the first end portion 324A of the guide pin 324 of each of the second segments 320) is positioned at a first end portion 314A of the guide slot 314 of the first segment 310 of the adjacent rod assembly 390. In the unfolded configuration, each of the protrusions 354 (of each of the fifth segments 350) is positioned at a first end portion 352A of the recess 352 of the fifth segment 350 of the adjacent rod assembly 390, as shown in FIG. 7A. In some implementations, the positioning of each of the protrusions 354 against the first end portion 352 of the corresponding recess 352 of the adjacent rod assembly 390 may restrict further rotation of the hinge mechanism 300, the bendable sheet 400, and the foldable display 202 in a direction F1, as shown in FIG. 7A. The stopping mechanism formed by the positioning of the protrusions 354 against the first end portions 352A of the recesses 352 may prevent the foldable display 202 from exceeding an allowable bending radius. For example, the stopping mechanism formed by the positioning of the protrusions 354 against the first end portions 352A of the recesses 352 may prevent the foldable display 202 from bending beyond approximately 180 degrees.

In response to an externally applied force, the hinge mechanism 300 (and computing device 200/foldable display 202) may be moved, or pivoted, in the direction F2, as shown in FIGS. 6B and 7B, from the unfolded configuration shown in FIGS. 6A and 7A to the folded configuration shown in FIGS. 6C and 7C. In moving between the unfolded configuration and the fully folded configuration, each of the rod assemblies 390, which each defining a corresponding pivot axis, may move, or pivot, about its corresponding pivot axis to guide the unfolding/folding motion of the foldable display 202. In some implementations, the movement, or pivoting, of the rod assemblies 390 may be somewhat sequential. That is, the guide pins 324 may move in the slots 314, 334 in sequence, for example, beginning with the rod assembly 390A, then the rod assembly 390B, then the rod assembly 390C, and so on, until the fully folded configuration is achieved.

For example, as shown in the interim configuration, or partially folded configuration illustrated in FIGS. 6B and 7B, movement of the individual rod assemblies 390 about their respective pivot axes may be substantially sequential, corresponding to the folding/unfolding motion of the computing device 200/foldable display 202. For example, as shown in the interim configuration illustrated in FIGS. 6B and 7B, a first portion of the bendable section 216 of the foldable display 202 is bent, or folded (corresponding, for example, to the rod assemblies 390B, 390C and 390D in this example), indicating those rod assemblies 390 have pivoted, while a second portion (corresponding, for example, to the rod assemblies 390E, 390F, 390G and 390H in this example) remains substantially planar, indicating those rod assemblies 390 have not yet pivoted.

In this interim configuration, or partially folded configuration, the guide pins 324 of the first, second, third and fourth rod assemblies 390A, 390B, 390C and 390D (corresponding to the bent portion of the foldable display 202) have moved away from the first end portion 314A of the respective guide slot 314 of the adjacent rod assemblies 390B, 390C, 390D and 390E, respectively, to an interim position within the respective guide slot 314, toward a second end portion 314B of the guide slot 314, as shown in FIG. 6A. With this, the protrusions 317 of the second, third, fourth and fifth rod assemblies 390B, 390C, 390D and 390E have moved into the guide recesses 316 of the first, second, third and fourth rod assemblies 390A, 390B, 390C and 390D, respectively. In this configuration, the protrusions 317 of the sixth, seventh and eighth rod assemblies 390E, 390F and 390G are not yet engaged in the guide recesses 316 of the fifth, sixth and seventh rod assemblies 390D, 390E and 390F, respectively.

In this interim configuration, or partially folded configuration, the guide pins 324 of the fifth, sixth, seventh and eighth rod assemblies 390E, 390F, 390G and 390H (corresponding to the substantially planar portion of the foldable display 202) remain at the first end portion 314A of the respective guide slot 314 of the adjacent rod assemblies 390, as shown in FIG. 6A. Similarly, in this interim configuration, the protrusions 354 of the first, second, third and fourth rod assemblies 390A, 390B, 390C and 390D (corresponding to the folded portion of the foldable display 202) have moved away from the first end portion 352A of the respective recess 352 of the adjacent rod assemblies 390B, 390C, 390D and 390E, respectively, to an interim position within the respective recess 352, as shown in FIG. 7A. In this interim configuration, the protrusions 354 of the fifth, sixth, seventh and eighth rod assemblies 390E, 390F, 390G and 390H (corresponding to the substantially planar portion of the foldable display 202) remain at the first end portion 352A of the respective recess 352 of the adjacent rod assemblies 390, as shown in FIG. 7A.

In the fully folded configuration, each of the guide pins 324 is now positioned at the second end portion 314B of the guide slot 314 of the adjacent rod assembly 390, and each of the protrusions 317 is now received in the guide recess 316 of the adjacent rod assembly 390, as shown in FIG. 6C. In the fully folded configuration, each of the protrusions 354 is now positioned at a second end portion 352B of the recess 352 of the adjacent rod assembly 390, as shown in FIG. 7A.

As noted above, the hinge mechanism 300 may be assembled as described above and coupled to the housing 240 of a computing device such as the exemplary computing device 200 shown in FIGS. 2A-2C to provide for a fluid, relatively natural, motion between the unfolded and folded configurations, while avoiding a shift in the neutral axis of the foldable display 202 and maintaining the foldable display 202 within allowable bending limits. In some implementations, magnets may be included in the computing device 200 to, for example, maintain the computing device 200 in the unfolded configuration and/or in the folded configuration. That is, magnets may provide a reinforcement mechanism for maintaining the computing device 200 including the foldable display 202 in a desired configuration.

For example, as shown in FIGS. 8A-8C, in some implementations, one or more first magnets 260 may be provided at corresponding positions along an outer edge portion of the first housing 240A and an outer edge portion of the second housing 240B of the computing device 200. In the folded configuration shown in FIG. 8C, the first magnets 260 may be aligned, and exert an attractive force that draws and holds the first and second housings 240A, 240B together in the folded configuration. In some implementations, one or more second magnets 270 may be provided at corresponding positions along an inner edge portion of the first housing 240A and an inner edge of the second housing 240B of the computing device 200. In the unfolded configuration shown in FIG. 8B, the second magnets 270 may be aligned, and exert an attractive force that draws and holds the first and second housings 240A, 240B together in the unfolded configuration.

In a computing device including a hinge mechanism, in accordance with implementations as described herein, the hinge mechanism may dynamically support and guide the folding and unfolding of a foldable display, with a relatively natural motion, while also providing support to the bendable section of the foldable display, avoiding shifting of the neutral axis of the foldable display, and providing for planarity of the foldable display in the unfolded configuration, particularly in the bendable section of the foldable display.

The devices and apparatuses described herein can be included as part of a computing device, that includes, for example, a processor for executing instructions and a memory for storing the executable instructions. Specific structural and functional details disclosed herein are merely representative for purposes of describing example embodiments. Example embodiments, however, be embodied in many alternate forms and should not be construed as limited to only the embodiments set forth herein.

It is understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term and/or includes any and all combinations of one or more of the associated listed items.

It is understood that when an element is referred to as being connected or coupled to another element, it can be directly connected or coupled to the other element or intervening elements may be present. In contrast, when an element is referred to as being directly connected or directly coupled to another element, there are no intervening elements present. Other words used to describe the relationship between elements should be interpreted in a like fashion (e.g., between versus directly between, adjacent versus directly adjacent, etc.).

The terminology used herein is for the purpose of describing particular embodiments only and is not intended to be limiting of example embodiments. As used herein, the singular forms a, and an, are intended to include the plural forms as well, unless the context clearly indicates otherwise. It will be further understood that the terms comprises, comprising, includes and/or including, when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

It should be borne in mind, however, that all of these and similar terms are to be associated with the appropriate physical quantities and are merely convenient labels applied to these quantities. Unless specifically stated otherwise, or as is apparent from the discussion, terms such as processing or computing or calculating or determining of displaying or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

In the following some examples are described.

Example 1: A hinge mechanism, comprising: a plurality of rod assemblies arranged in a respective plurality of rows, wherein each of the plurality of rod assemblies includes a plurality of segments sequentially arranged in a longitudinal direction of the respective rod assembly, the plurality of segments defining: a first section of the hinge mechanism that guides a sequential pivoting motion of each of the plurality of rod assemblies; a second section of the hinge mechanism that couples each of the plurality of rod assemblies to at least one adjacent rod assembly; and a third section of the hinge mechanism that restricts movement of the plurality of rod assemblies to maintain a position of the hinge mechanism between a minimum bend radius and a maximum bend radius.

Example 2: The hinge mechanism of example 1, wherein the plurality of segments includes: a first segment, including: a first body; a shaft extending outward from an end portion of the first body; a guide slot defined in a protrusion formed on a first side portion of the first body; and a guide recess defined in a second side portion of the first body; a second segment, including: a second body; a slot formed in and extending through the second body; a guide recess defined in a first side portion of the second body; and a guide pin positioned along a second side portion of the second body; and a third segment, including: a third body; a shaft extending outward from an end portion of the third body; a guide slot defined in a protrusion formed on a first side portion of the third body; and a guide recess defined in a second side portion of the third body, wherein the first section of the hinge mechanism is defined by the first, second and third segments of each of the plurality of rod assemblies.

Example 3: The hinge mechanism of example 2, wherein the shaft of the first segment is received in a first end portion of the slot formed in the second segment, and the shaft of the third segment is received in a second end portion of the slot formed in the second segment, to couple the first, second and third segments, so as to axially couple the first, second and third segments.

Example 4: The hinge mechanism of example 2 or 3, wherein a first end portion of the guide pin of the second segment of a first rod assembly of the plurality of rod assemblies is received in the guide slot of the first segment of a second rod assembly of the plurality of rod assemblies, and a second end portion of the guide pin of the second segment of the first rod assembly is received in the guide slot of the third segment of the second rod assembly.

Example 5: The hinge mechanism of at least one of the preceding examples, wherein the first and second rod assemblies are positioned adjacent to each other in the plurality of rows of rod assemblies, such that the second rod assembly pivots in response to a pivoting movement of the first rod assembly and corresponding movement of the guide pin of the first rod assembly in the guide slot of the first segment of the second rod assembly and the guide slot of the third segment of the second rod assembly.

Example 6: The hinge mechanism of at least one of the examples 2 to 5, wherein the plurality of segments also includes a fourth segment, including: a rod having a first end coupled to the third segment; and at least one linkage mounted on the rod, wherein the at least one linkage couples the respective rod assembly to the rod of an adjacent rod assembly, and wherein the second section of the hinge mechanism is defined by the fourth segment of each of the plurality of rod assemblies.

Example 7: The hinge mechanism of example 6, wherein the at least one linkage includes: a fourth body; a first passage formed through the fourth body, wherein the rod extends through the first passage; a second passage formed through the fourth body; and a connecting pin positioned in the second passage, wherein the connection pin couples the respective rod assembly to the second passage of the at least one linkage of an adjacent rod assembly.

Example 8: The hinge mechanism of example 7, wherein the rod is press fit in the first passage, and the connecting pin is press fit in the second passage.

Example 9: The hinge mechanism of example 6 or 7, wherein the plurality of segments also includes: a fifth segment, wherein a second end of the rod is coupled to the fifth segment; and a sixth segment coupled to the fifth segment, wherein the third section of the hinge mechanism is defined by the fifth and sixth segments of each of the plurality of rod assemblies.

Example 10: The hinge mechanism of example 9, wherein the fifth segment includes: a fifth body; a guide recess formed in a first side portion of the fifth body; and a protrusion formed on a second side portion of the fifth body, wherein the protrusion is movably received in the guide recess of an adjacent rod assembly, and
wherein rotation of adjacent rod assemblies is restricted in a first direction in response to a positioning of the protrusion of the respective rod assembly against a first end portion of the guide recess in the adjacent rod assembly, and rotation of adjacent rod assemblies is restricted in a second direction in response to a positioning of the protrusion of the respective rod assembly at a second end portion of the guide recess in the adjacent rod assembly and a positioning of the second side portion of the fifth segment of the respective rod assembly against the first side portion of the fifth segment of the adjacent rod assembly.

Example 11: The hinge mechanism of example 9 or 10, wherein the sixth segment includes: a sixth body; a protrusion formed on a first side portion of the sixth body; and a guide recess formed on a second side portion of the sixth body,
wherein the protrusion is movably received in the guide recess of an adjacent rod assembly, and wherein rotation of adjacent rod assemblies is restricted in the first direction in response to a positioning of the protrusion of the respective rod assembly against a first end portion of the guide recess in the adjacent rod assembly, and rotation of adjacent rod assemblies is restricted in the second direction in response to a positioning of the protrusion of the respective rod assembly at a second end portion of the guide recess in the adjacent rod assembly and a positioning of the second side portion of the sixth segment of the respective rod assembly against the first side portion of the second segment of the adjacent rod assembly.

Example 12: The hinge mechanism of at least one of the preceding examples, further comprising a bendable sheet coupled to the plurality of rod assemblies, and configured to be positioned between the hinge mechanism and a foldable display of a computing device.

Example 13: The hinge mechanism of at least one of the preceding examples, wherein the plurality of segments of each rod assembly, of the plurality of rod assemblies, are coaxially aligned, and each rod assembly, of the plurality of rod assemblies, defines a respective pivot axis of the hinge mechanism.

Example 14: A computing device, comprising: a housing; a foldable display coupled to the housing; a hinge mechanism received in the housing, at a position corresponding to a bendable section of the foldable display; and a bendable sheet positioned between the hinge mechanism and the foldable display, wherein the hinge mechanism has the features of at least one of the examples 1 to 13 or includes a plurality of rod assemblies arranged in a respective plurality of rows, each rod assembly of the plurality of rod assemblies is movably coupled to at least one adjacent rod assembly of the plurality of rod assemblies, and the plurality of rod assemblies define a respective plurality of pivot axes of the hinge mechanism, wherein the plurality of rod assemblies pivot sequentially about the respective plurality of pivot axes in response to an external force to guide a folding of the foldable display.

Example 15: The computing device of example 14, wherein each rod assembly includes: a first section guiding a folding and an unfolding motion of the hinge mechanism and the foldable display coupled thereto, including: a first segment; a second segment coupled to the first segment; and a third segment coupled to the second segment; a second section coupling the rod assembly to an adjacent rod assembly, and generating friction that resists motion of the hinge mechanism, the second section including: a fourth segment coupled to the third segment; a third section that restricts movement of the rod assembly to maintain a position of the hinge mechanism between a minimum bend radius and a maximum bend radius of the foldable display coupled thereto, the third section including: a fifth segment coupled to the fourth segment; and a sixth segment coupled to the fifth segment.

Example 16: The computing device of example 14 or 15, wherein the first segment includes: a first body; a shaft extending outward from an end portion of the first body; a guide slot defined in a protrusion formed on a first side portion of the first body; and a guide recess defined in a second side portion of the first body; and
the second segment includes: a second body; a slot formed in and extending through the second body; a guide recess defined in a first side portion of the second body; and
a guide pin positioned along a second side portion of the second body; and the third segment includes: a third body; a shaft extending outward from an end portion of the third body; a guide slot defined in a protrusion formed on a first side portion of the third body; and a guide recess defined in a second side portion of the third body.

Example 17: The computing device of example 15 or 16, wherein the fourth segment includes: a rod having a first end coupled to the third segment; and
at least one linkage mounted on the rod, including: a fourth body; a first passage formed through the fourth body, wherein the rod extends through the first passage; and a second passage formed through the fourth body; and a connecting pin positioned in the second passage, wherein the connection pin couples the respective rod assembly to the second passage of the at least one linkage of the adjacent rod assembly.

Example 18. The computing device of at least one of the examples 14 to 17, wherein the fifth segment includes: a fifth body; a guide recess formed in a first side portion of the fifth body; and a protrusion formed on a second side portion of the fifth body, wherein the protrusion is movably received in the guide recess of an adjacent rod assembly, and wherein rotation of adjacent rod assemblies is restricted in a first direction in response to a positioning of the protrusion of the respective rod assembly against a first end portion of the guide recess in the adjacent rod assembly, and rotation of adjacent rod assemblies is restricted in a second direction in response to a positioning of the protrusion of the respective rod assembly at a second end portion of the guide recess in the adjacent rod assembly and a positioning of the second side portion of the fifth segment of the respective rod assembly against the first side portion of the fifth segment of the adjacent rod assembly.

Example 19. The computing device of at least one of the examples 14 to 17, wherein the sixth segment includes: a sixth body; a protrusion formed on a first side portion of the sixth body; and a guide recess formed on a second side portion of the sixth body, wherein the protrusion is movably received in the guide recess of an adjacent rod assembly, and wherein rotation of adjacent rod assemblies is restricted in the first direction in response to a positioning of the protrusion of the respective rod assembly against a first end portion of the guide recess in the adjacent rod assembly, and rotation of adjacent rod assemblies is restricted in the second direction in response to a positioning of the protrusion of the respective rod assembly at a second end portion of the guide recess in the adjacent rod assembly and a positioning of the second side portion of the sixth segment of the respective rod assembly against the first side portion of the second segment of the adjacent rod assembly.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

What is claimed is:

1. A hinge mechanism, comprising:
a plurality of rod assemblies arranged in a respective plurality of rows extending in parallel, wherein each of the plurality of rod assemblies includes a plurality of segments sequentially arranged in a longitudinal direction of the respective rod assembly, the plurality of rod assemblies define:
a first section of the hinge mechanism that guides a sequential pivoting motion of each of the plurality of rod assemblies;
a second section of the hinge mechanism that couples each of the plurality of rod assemblies to at least one adjacent rod assembly; and a third section of the hinge mechanism, wherein the third section restricts movement of the plurality of rod assemblies to maintain a position of the hinge mechanism between a minimum bend radius and a maximum bend radius,
wherein the plurality of segments include:
   a first segment comprising a first body and a shaft extending outward from an end portion of the first body;
   a second segment comprising a second body and a slot formed in and extending through the second body; and
   a third segment comprising a third body and a shaft extending outward from an end portion of the third body,
wherein the first section of the hinge mechanism is defined by the first, second and third segments of each of the plurality of rod assemblies,
wherein the shaft of the first segment is received in a first end portion of the slot formed in the second segment, and
the shaft of the third segment is received in a second end portion of the slot formed in the second segment, to couple the first, second and third segments, so as to axially couple the first, second and third segments.

2. The hinge mechanism of claim 1, wherein:
the first segment further includes:
   a guide slot defined in a protrusion formed on a first side portion of the first body; and
   a guide recess defined in a second side portion of the first body;
the second segment further includes:
   a guide recess defined in a first side portion of the second body; and
   a guide pin positioned along a second side portion of the second body; and
the third segment further includes:
   a guide slot defined in a protrusion formed on a first side portion of the third body; and
   a guide recess defined in a second side portion of the third body.

3. The hinge mechanism of claim 2, wherein
a first end portion of the guide pin of the second segment of a first rod assembly of the plurality of rod assemblies is received in the guide slot of the first segment of a second rod assembly of the plurality of rod assemblies, and
a second end portion of the guide pin of the second segment of the first rod assembly is received in the guide slot of the third segment of the second rod assembly.

4. The hinge mechanism of claim 3, wherein the first and second rod assemblies are positioned adjacent to each other in the plurality of rows of rod assemblies, such that the second rod assembly pivots in response to a pivoting movement of the first rod assembly and corresponding movement of the guide pin of the first rod assembly in the guide slot of the first segment of the second rod assembly and the guide slot of the third segment of the second rod assembly.

5. The hinge mechanism of claim 2, wherein the plurality of segments also includes a fourth segment, including:
   a rod having a first end coupled to the third segment; and
   at least one linkage mounted on the rod, wherein the at least one linkage couples the respective rod assembly to the rod of an adjacent rod assembly, and
wherein the second section of the hinge mechanism is defined by the fourth segment of each of the plurality of rod assemblies.

6. The hinge mechanism of claim 5, wherein the at least one linkage includes:
   a fourth body;
   a first passage formed through the fourth body, wherein the rod extends through the first passage;
   a second passage formed through the fourth body; and
   a connecting pin positioned in the second passage, wherein the connection pin couples the respective rod assembly to the second passage of the at least one linkage of an adjacent rod assembly.

7. The hinge mechanism of claim 6, wherein the rod is press fit in the first passage, and the connecting pin is press fit in the second passage.

8. The hinge mechanism of claim 5, wherein the plurality of segments also includes:
   a fifth segment, wherein a second end of the rod is coupled to the fifth segment; and
   a sixth segment coupled to the fifth segment,
wherein the third section of the hinge mechanism is defined by the fifth and sixth segments of each of the plurality of rod assemblies.

9. The hinge mechanism of claim 8, wherein the fifth segment includes:
   a fifth body;
   a guide recess formed in a first side portion of the fifth body; and
   a protrusion formed on a second side portion of the fifth body,
wherein the protrusion is movably received in the guide recess of an adjacent rod assembly, and
wherein rotation of adjacent rod assemblies is restricted in a first direction in response to a positioning of the protrusion of the respective rod assembly against a first end portion of the guide recess in the adjacent rod assembly, and
rotation of adjacent rod assemblies is restricted in a second direction in response to a positioning of the protrusion of the respective rod assembly at a second end portion of the guide recess in the adjacent rod assembly and a positioning of the second side portion of the fifth segment of the respective rod assembly against the first side portion of the fifth segment of the adjacent rod assembly.

10. The hinge mechanism of claim 9, wherein the sixth segment includes:
   a sixth body;
   a protrusion formed on a first side portion of the sixth body; and
   a guide recess formed on a second side portion of the sixth body,
wherein the protrusion is movably received in the guide recess of an adjacent rod assembly, and
wherein rotation of adjacent rod assemblies is restricted in the first direction in response to a positioning of the protrusion of the respective rod assembly against a first end portion of the guide recess in the adjacent rod assembly, and
rotation of adjacent rod assemblies is restricted in the second direction in response to a positioning of the protrusion of the respective rod assembly at a second end portion of the guide recess in the adjacent rod assembly and a positioning of the second side portion of the sixth segment of the respective rod assembly against the first side portion of the second segment of the adjacent rod assembly.

11. The hinge mechanism of claim 1, further comprising a bendable sheet coupled to the plurality of rod assemblies and positioned between the hinge mechanism and a foldable display of a computing device.

12. The hinge mechanism of claim 1, wherein
the plurality of segments of each rod assembly, of the plurality of rod assemblies, are coaxially aligned, and
each rod assembly, of the plurality of rod assemblies, defines a respective pivot axis of the hinge mechanism.

13. A hinge mechanism, comprising:
a plurality of rod assemblies arranged in a respective plurality of rows extending in parallel, wherein each of the plurality of rod assemblies includes a plurality of segments sequentially arranged in a longitudinal direction of the respective rod assembly, the plurality of rod assemblies define:
a first section of the hinge mechanism that guides a sequential pivoting motion of each of the plurality of rod assemblies;
a second section of the hinge mechanism that couples each of the plurality of rod assemblies to at least one adjacent rod assembly; and
a third section of the hinge mechanism that restricts movement of the plurality of rod assemblies to maintain a position of the hinge mechanism between a minimum bend radius and a maximum bend radius, wherein the plurality of segments includes:
a first segment, including:
a first body;
a shaft extending outward from an end portion of the first body;
a guide slot defined in a protrusion formed on a first side portion of the first body; and
a guide recess defined in a second side portion of the first body;
a second segment, including:
a second body;
a slot formed in and extending through the second body;
a guide recess defined in a first side portion of the second body; and
a guide pin positioned along a second side portion of the second body; and
a third segment, including:
a third body;
a shaft extending outward from an end portion of the third body;
a guide slot defined in a protrusion formed on a first side portion of the third body; and
a guide recess defined in a second side portion of the third body,
wherein the first section of the hinge mechanism is defined by the first, second and third segments of each of the plurality of rod assemblies,
wherein the shaft of the first segment is received in a first end portion of the slot formed in the second segment, and
wherein the shaft of the third segment is received in a second end portion of the slot formed in the second segment, to couple the first, second and third segments, so as to axially couple the first, second and third segments.

14. The hinge mechanism of claim 13, wherein
a first end portion of the guide pin of the second segment of a first rod assembly of the plurality of rod assemblies is received in the guide slot of the first segment of a second rod assembly of the plurality of rod assemblies, and
a second end portion of the guide pin of the second segment of the first rod assembly is received in the guide slot of the third segment of the second rod assembly.

15. A hinge mechanism, comprising:
a plurality of rod assemblies arranged in a respective plurality of rows extending in parallel, wherein each of the plurality of rod assemblies includes a plurality of segments sequentially arranged in a longitudinal direction of the respective rod assembly, the plurality of rod assemblies define:
a first section of the hinge mechanism that guides a sequential pivoting motion of each of the plurality of rod assemblies;
a second section of the hinge mechanism that couples each of the plurality of rod assemblies to at least one adjacent rod assembly; and
a third section of the hinge mechanism that restricts movement of the plurality of rod assemblies to maintain a position of the hinge mechanism between a minimum bend radius and a maximum bend radius, wherein the plurality of segments includes:
a first segment, including:
a first body;
a shaft extending outward from an end portion of the first body;
a guide slot defined in a protrusion formed on a first side portion of the first body; and
a guide recess defined in a second side portion of the first body;
a second segment, including:
a second body;
a slot formed in and extending through the second body;
a guide recess defined in a first side portion of the second body; and
a guide pin positioned along a second side portion of the second body; and
a third segment, including:
a third body;
a shaft extending outward from an end portion of the third body;
a guide slot defined in a protrusion formed on a first side portion of the third body; and
a guide recess defined in a second side portion of the third body,
a fourth segment, including:
a rod having a first end coupled to the third segment; and
at least one linkage mounted on the rod, wherein the at least one linkage couples the respective rod assembly to the rod of an adjacent rod assembly,
wherein the first section of the hinge mechanism is defined by the first, second and third segments of each of the plurality of rod assemblies, and
wherein the second section of the hinge mechanism is defined by the fourth segment of each of the plurality of rod assemblies.

16. The hinge mechanism of claim 15, wherein the at least one linkage includes:
   a fourth body;
   a first passage formed through the fourth body, wherein the rod extends through the first passage;
   a second passage formed through the fourth body; and
   a connecting pin positioned in the second passage, wherein the connection pin couples the respective rod assembly to the second passage of the at least one linkage of an adjacent rod assembly.

17. The hinge mechanism of claim 16, wherein the rod is press fit in the first passage, and the connecting pin is press fit in the second passage.

18. The hinge mechanism of claim 15, wherein the plurality of segments also includes:
   a fifth segment, wherein a second end of the rod is coupled to the fifth segment; and
   a sixth segment coupled to the fifth segment,
   wherein the third section of the hinge mechanism is defined by the fifth and sixth segments of each of the plurality of rod assemblies.

19. The hinge mechanism of claim 18, wherein the fifth segment includes:
   a fifth body;
   a guide recess formed in a first side portion of the fifth body; and
   a protrusion formed on a second side portion of the fifth body,
   wherein the protrusion is movably received in the guide recess of an adjacent rod assembly, and
   wherein rotation of adjacent rod assemblies is restricted in a first direction in response to a positioning of the protrusion of the respective rod assembly against a first end portion of the guide recess in the adjacent rod assembly, and
   rotation of adjacent rod assemblies is restricted in a second direction in response to a positioning of the protrusion of the respective rod assembly at a second end portion of the guide recess in the adjacent rod assembly and a positioning of the second side portion of the fifth segment of the respective rod assembly against the first side portion of the fifth segment of the adjacent rod assembly.

\* \* \* \* \*